(12) United States Patent
Billingsley

(10) Patent No.: US 7,567,909 B1
(45) Date of Patent: Jul. 28, 2009

(54) ELECTRONIC TRANSACTIONS

(76) Inventor: Richard Billingsley, 17/38 Glebe Street, Randwick, NSW 2031 (AU)

( * ) Notice: Subject to any disclaimer, the term of this patent is extended or adjusted under 35 U.S.C. 154(b) by 0 days.

(21) Appl. No.: 09/269,618

(22) PCT Filed: Sep. 17, 1997

(86) PCT No.: PCT/GB97/02512

§ 371 (c)(1),
(2), (4) Date: Jul. 21, 1999

(87) PCT Pub. No.: WO98/13795

PCT Pub. Date: Apr. 2, 1998

(30) Foreign Application Priority Data

Sep. 26, 1996 (GB) ................... 9620079.5

(51) Int. Cl.
G06F 17/60 (2006.01)
(52) U.S. Cl. ................ 705/1; 705/50; 705/51
(58) Field of Classification Search ............ 705/1, 705/64–69, 37–45, 76–79, 50, 51; 380/30
See application file for complete search history.

(56) References Cited

U.S. PATENT DOCUMENTS

| 4,885,777 | A | | 12/1989 | Takaragi et al. ............ 705/75 |
| 4,977,595 | A | * | 12/1990 | Ohta et al. ............... 705/69 |
| 5,224,162 | A | * | 6/1993 | Okamoto et al. ............ 705/69 |
| 5,297,026 | A | * | 3/1994 | Hoffman ................. 705/14 |
| 5,511,121 | A | | 4/1996 | Yacobi .................. 705/69 |

(Continued)

FOREIGN PATENT DOCUMENTS

EP 0 391 261 A 10/1990

(Continued)

OTHER PUBLICATIONS

Schneier, Bruce. "Applies Cryptography." $2^{nd}$ ed. John Wiley and Sons; New York. © 1996. pp. 21-46.*

(Continued)

Primary Examiner—Pierre E Elisca
(74) Attorney, Agent, or Firm—Kali Law Group, P.C.

(57) ABSTRACT

Methods and apparatus are disclosed for effecting transfers using an electronic representation of a commodity, such as money. The commodity is represented by a value note issued by a bank or other authority, and which includes: first information representative of public key information for a bearer; second information representative of a commodity represented by the value note; and third information representative of an issuer's signature which is verifiable from information including the first information, the second information and public key information for the issuer. Digital endorsement signatures are used to redeem one or more value notes for one or more others, and to authenticate information in the value notes to prevent alteration. Redemption instructions permit, for example, transfer of value note money to another party, encashing of value note money, consolation of individual value notes, and generation of short term guaranteed value notes.

12 Claims, 13 Drawing Sheets

---

STANDARD INSTRUCTION FORMAT:

(a) BEARER'S PUBLIC KEY
(b) LIST OF VALUE NOTES (EXISITNG) USED IN TRANSACTION
(c) TOTAL VALUE
(d) ATTEMPT NUMBER
(f) LIST OF PAYMENT ENTRIES (1 or more)
(g) SIGNATURE, USING BEARER'S PUBLIC KEY

U.S. PATENT DOCUMENTS

| | | | | |
|---|---|---|---|---|
| 5,655,007 | A | * | 8/1997 | McAllister ............... 379/91.01 |
| 5,754,654 | A | * | 5/1998 | Hiroya et al. ................. 705/75 |
| 5,768,385 | A | * | 6/1998 | Simon .......................... 705/69 |
| 5,832,089 | A | * | 11/1998 | Kravitz et al. ................ 705/69 |
| 5,850,442 | A | * | 12/1998 | Muftic ......................... 705/65 |
| 5,889,862 | A | * | 3/1999 | Ohta et al. .................... 705/69 |
| 5,898,154 | A | * | 4/1999 | Rosen ........................ 235/379 |
| 5,999,625 | A | * | 12/1999 | Bellare et al. ................. 705/64 |
| 6,125,349 | A | * | 9/2000 | Maher ........................... 705/1 |

FOREIGN PATENT DOCUMENTS

| | | |
|---|---|---|
| EP | 0 518 365 | 12/1992 |
| EP | 0 639 907 | 2/1995 |
| JP | 2006285561 A * | 10/2006 |

OTHER PUBLICATIONS

O'Mahony, "Electronic Payment Systems" (c) 1997. Artech House, Inc. Norwood, Mass.*

Cox et al., "Netbill Security and Transaction Protocol", Proceedings of the Usenix Workshop of Electronic Commerce, Jul. 11, 1995, pp. 77-88.

Chapter 19 from *Applied Cryptography*, $2^{nd}$ ed., written by Bruce Schneier.

* cited by examiner

ELECTRONIC TRANSACTIONS

BACKGROUND

This invention relates to electronic transactions or transfers using an electronic representation of a commodity. The term "commodity" is used broadly herein to refer to anything which may be used in a transaction, including, but not limited to, items of value and money. The invention is especially suitable for use in financial transactions, but it is not limited exclusively to such use. The invention is also especially suitable for use over a public communication network, such as the Internet, but again the invention is not limited to such use.

With electronic money systems, there are a number of problem areas, as follows:

SECURITY—To prevent fraudulent interference with transactions involving the money. This is particularly important for transactions over public communication systems, such as over the Internet, or by electronic mail, where the electronic message necessarily passes through a number of different computer systems, and is vulnerable to copying by thieves. Security is also needed to prevent the same electronic money from being spent twice.

AUTHENTICATION—So that users of the electronic money can verify, without needing to contact the bank or other money issuer, that the electronic money they receive is valid (i.e. not forged), has not been "spent" already, and will be honored by the bank or other electronic money issuer.

ANONYMITY—To assure users of the electronic money that the transactions and transfers in which they are involved will, if desired, remain confidential, in the same manner as cash transactions, and will not be tracked by banks or other bodies who might be interested in users' spending habits. Further, neither current users nor new users should have to provide any personal information which might reveal their true identity to the bank or to any other electronic money handling or regulating authority.

AUDITABILITY—To reassure the bank or the money issuer that electronic money which they receive for redemption did, in fact, originate from that bank and has not been issued by some other issuer or possibly forged with the aid of confidential bank information.

DIVISIBILITY—To enable a user of the electronic money to spend a portion of the money, or to obtain change as part of the transaction. It would also be desirable to accommodate fractions of a denomination of money, and to facilitate money transfers from one currency to another without concerns over denomination. Similarly, it would be desirable to accommodate consolidation of electronic "change".

NON-AFFILIATION—To permit a user to possess, receive and spend the electronic money without the need to be registered with, or have an account with, a particular bank or other electronic money issuer. Further, the user should preferably not have to provide any third party with any personal information from which the person's identity could be ascertained, or which would need to be updated if the person were to move residence, or to get married, for example.

TRANFERABLE—To enable the electronic money to be transferred to anyone independently of the type of transaction or transfer, and regardless of whether the parties are commercial bodies or private individuals.

INDEPENDENCE—To enable electronic money to be spent and received independently of the location of the parties to the transaction. For example, the parties may be in the same physical location, or they may be in completely different locations.

OFF-LINE PAYMENT—To enable the electronic money to be transferred without needing to simultaneously contact the bank at the time of transfer.

NON-LIABILITY—Particularly when communicating over a public communication system, there are occasions when communication is interrupted, or a message is not confirmed as having been received, or a computer system crashes. In such a situation, it may be impossible to establish whether an instructed electronic money transaction or transfer has taken place. In other situations, data representing the electronic money might be lost. It is desirable that an electronic money user be able to repeat the same transaction, or make "back-up" copies of the electronic money, without increasing the liability of the user and the bank.

One example of a known electronic money system is "e-cash". In that system, electronic coins of fixed denomination are represented by serial numbers. When the serial numbers are transmitted to a third party, they can be redeemed at an issuing bank. However, with such a system, it is difficult for a person receiving money to verify, without contacting the issuing bank, that the money has not previously been doubly spent (either accidentally, or deliberately). The money is only authenticated by the bank when the receiver of the money attempts to redeem it at the bank. Furthermore the system does not provide divisibility of the electronic money, since the denominations of the coins are fixed.

U.S. Pat. No. 5,511,121 describes a system which allows a bank to detect the double spending of an electronic coin when the coin is redeemed twice, by using a El Gamal signature function. However, such a system relies on the identity of the user being derivable from the user's key, which necessitates the user being registered with a central authority. Furthermore, the system does not enable a receiver of the electronic coins the ability to verify that the coins are valid before the receiver accepts the coins as payment; it merely enables the detection of double spending when the same coin is redeemed at the bank by two or more users. Furthermore, if a communication involving the electronic money needs to be repeated or modified, there is risk that the double signatures which result will yield the identity of the spender, and possibly create an embarrassing situation in which the spender may be accused of fraudulently spending the coin twice.

Reference is also made to "NetCash: A design for practical electronic currency on the Internet", by G. Medvinsky and C. Neuman, Proceedings of the First ACM Conference and Communications Security, November 1993. This article proposes a framework for supporting real-time anonymous electronic payments using electronic coins sealed with the private signature key of an issuing authority. The coins can be transferred on-line or off-line, and exchanged for electronic checks. However, such coins may be difficult to verify as valid currency without contacting the money issuing authority, and there is no facility for division or consolidation.

Reference is also made to EP-A-0139313 which describes a method of transforming or "blinding" a message to be signed into a form which obscures the content of the message for signature, but which retains the signature relationship when transformed back to the original message, even though the result is not readily associated with the transformed message.

The present invention has been devised bearing the above problem areas in mind.

BRIEF DESCRIPTION OF THE DRAWINGS

Embodiments of the invention are now described by way of example only with reference to the accompanying drawings, in which:—

DETAILED DESCRIPTION

Figure 1:
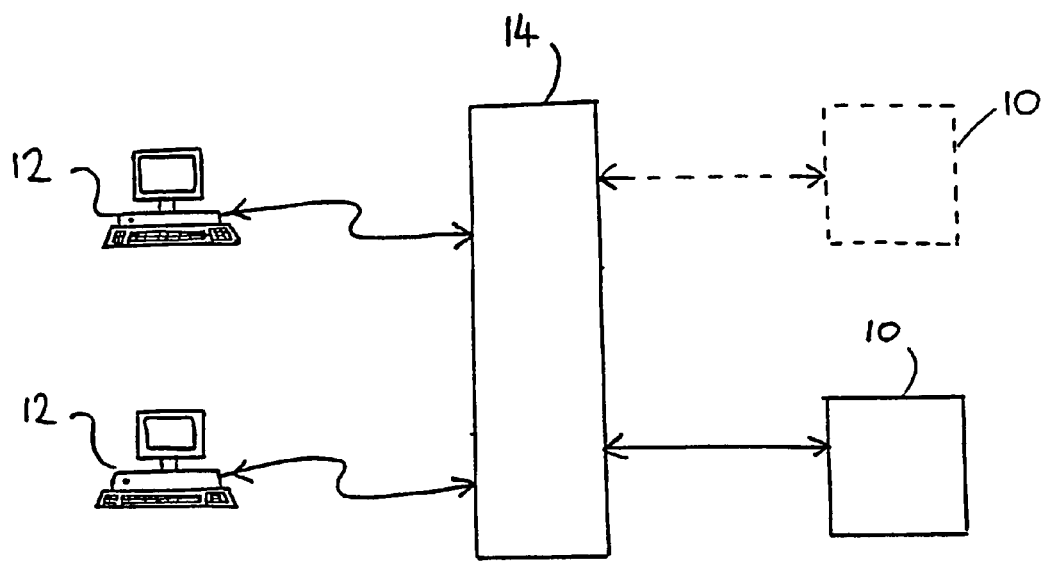
FIG. 1 is a schematic diagram of a system for handling value notes.

The present invention proposes the use of "value notes", which can be in the form of electronic messages, and represent a commodity, such as money. In one form, a value note may be regarded as being similar to a note of conventional currency in that it is promise by the note issuer to provide the bearer with the commodity on redemption of the value note. For example, if the value note represents money, then it is equivalent to cash in the bearer's hand.

The invention uses digital signatures, which are calculated by a signatory when "signing" or endorsing the value note. Each signature may be regarded as an encoded checksum or hashing (or other) function which is dependent on information in the value note (e.g. certain message text), and is dependent on a secret key known only to the signatory. The signature function is such that, without knowing the signatory's secret key, it is very difficult (and preferably impossible for practical purposes) to forge or decode the signature. However, with a given message and a given signature, it is possible to verify whether the signature matches the message. This is enabled by a public key for the signatory which may, for example, be included with the digital signature. The public key is such that, although it does not provide sufficient information to correctly calculate a signature for a message (the secret key is required for this), it does provide sufficient information to enable an independent verification to be made as to whether the signature matches the message.

The public key is derived from the secret key by a special function which is very difficult or impossible to reverse (making it safe to publicly disclose the public key to other parties without risk that the secret key will be discovered).

In accordance with one aspect of the invention, a value note comprises, or presents, information consisting of: first information which is either representative of, or is verifiably related to, public key information for the bearer; second information representative of a commodity represented by the value note; and third information representative of an issuer's signature which is verifiable from information including the bearer's public key, the second information and public key information for the issuer.

In a particularly preferred form, a value note comprises, or presents, information consisting of: first information representative of public key information for a bearer; second information representative of a commodity represented by the value note; and third information representative of an issuer's signature which is verifiable from information including the first information, the second information and public key information for the issuer.

With such aspects of the invention, a value note is secure and is easily verifiable by the bearer independently of the issuer. The value note is secure because the issuer's signature protects the public key information and the commodity information to prevent it from being altered. Should either or both of these items of information be altered, then the issuer's signature will no longer match the altered information, and this is easily verifiable by the bearer without having to contact the issuer.

The issuer's public key information is required to enable the verification to be carried out. This information could be included as part of the information in the value note. Additionally or alternatively, the issuer's public key information may be published, for example, in journals or newspapers, or it may be published over an electronic communication system, for example, over the Internet.

The information representing the value of the commodity may be any of:

(a) a fixed value specified in the value note, e.g. GB£ 8.50;

(b) a variable value defined by a formula or rule which is defined in the value note, e.g. for a lottery, "prize=(Prize fund Total £)/(No. of winners)", where one or both of the total prize fund and the number of winners might be a variable amount not known until completion of the competition; or (c) a fixed or variable value identified by a name or label, which cross refers to a known or established value, which may either be defined absolutely, or by an established rule or formula, e.g. for a lottery, the value may be defined by the label "PRIZE", or for a representation of shares indexes, the label may be "SELL VALUE".

Before a value note can be obtained, a bearer first has to select or generate a secret key and a public key as described above. The bearer keeps the secret key confidential and supplies the public key information to the value note issuer, for example, for inclusion as the first information in the value note. This information will be used later to verify whether the bearer's signature is correct when the value is redeemed (in a similar manner to that used on travelers checks). By using a public key in this way, the bearer can remain anonymous since the public key information does not have to identify the bearer. The signature key information can be chosen arbitrarily by the bearer; it does not need to be assigned to him, or be "registered" with, a bank or other governing authority. The bearer is also free to alter his signature information from one value note to another, and to use different signature information on different concurrent value notes.

The commodity represents the redeemable value of the value note. For example, if the note represents money, then the value is equivalent to cash. Similarly, if the note represents an agreement or offer to supply goods or services, or if it represents bonds, shares, or a lottery ticket, then this is the redeemable value in the note.

In order to redeem the value note, a bearer can append redemption instruction information to the note and then endorse the note and/or the payment instruction information with a digital signature (using the secret key from which the public key information has been derived). The bearer may then communicate the endorsed value note back to the issuer for redemption. In an alternative technique, the entire value note is not returned, but instead instruction information including only important identifying details of the value note, is transmitted to the issuer. The issuer can look up his own copy of the original value note in verifying whether the instructions, and the signature, are authentic.

It will be appreciated that only the original bearer will be able to "write" or calculate a correct signature with the knowledge of the secret key. The use of a bearer's signature in this way provides two advantages. Firstly, it guarantees that the value note has been endorsed by the true bearer, without revealing the identity of the bearer. Secondly, it guarantees that the bearer's redemption instructions have not been altered fraudulently. These advantages arise because the bearer's signature will only be verifiable using the public key information already included in the value note if:

(i) the signature has been generated using the same secret key used to generate the public key; and (ii) the redemption instructions are identical to those at the time the signature was calculated.

If information related to the bearer's public key, rather than the public key itself, is included in the value note, then it will be necessary for the payment instructions to include the bearer's public key so that the signature can be authenticated by the bank or other issuing authority during redemption. Nevertheless, security is still ensured, because only the true bearer will be able to supply an authentic public key which matches the public-key-related information in the value note. If a fraudulent bearer attempts to vary the public-key-related information in the value note, then this will be readily apparent since the value note information will no longer match the original issuer's signature (based on the public-key-related information).

Therefore, it is safe to transmit value notes and payment instructions openly over a public communication system. Should a thief attempt to alter the redemption instructions, or to forge the instructions signature, this will be immediately apparent to the issuer who can then take appropriate action. Furthermore, should a value note go astray in an electronic communication system, then either the issuer or the bearer can simply send a duplicate value note, or duplicate instructions, without increasing either the issuer's liability or the bearer's liability.

It will be appreciated that the security for each digital signature is dependent on the length of the signature information. With the invention, the liability at the time of signing lies with the signing party, and the onus is on the signing party to provide an appropriately secure signature to avoid increased liability. In other words, when an issuer (e.g. issuing bank) signs a blank value note to create an issued value note, the onus is on the bank to provide a signature which is sufficiently long to be undecodable for practical purposes. If the bank's signature is insufficiently long such that other parties can forge value notes, then the increased liability lies with the bank who will have to honor any value notes bearing a matching signature. Similarly, when a bearer signs a value note (for redemption), the onus is on the bearer to provide a sufficiently long signature information (for example the public key), to make the signature secure. If the signature is insufficiently long, other parties may be able to forge the bearer's signature. The increased liability therefore lies with the bearer, not the issuing bank, because the bank has only to honor the first presentation of a value note with a matching bearer signature.

The endorsing signature of the bearer should preferably be based on information including the public key of the seller (new bearer) and/or the public key of the buyer (current bearer), so that the public key information cannot subsequently be altered. If the public key information is included in the payment instruction information, then it will automatically be included in the endorsing signature. However, if the public key information is not included in the payment instruction information, then these items of information should preferably then be added separately to the information on which the endorsing signature is based.

The endorsing signature should preferably also be based on the serial number of the value note, especially if the value note is not being transmitted with the redemption instructions to the money handling authority. Additionally, it is preferred that the signature be based on the name (included in the value note) of the issuing bank (or other money handling authority), in case two different value notes bearing the same serial or identification number are issued by two different banks.

If desired, a value note may be encrypted before it is sent over a public communication system, as a further precaution for security and anonymity. For example, before communicating a value note to a bank, a bearer might encrypt the value note information using the bank's public key as an encryption key. When received at the bank, the bank computer will be able to decrypt the value note using the bank's secret key as a decryption key.

Preferably, the redemption instructions include a reference to redeem at least a proportion of the commodity I the form of a (first) new value note. Additionally, the redemption instructions may include a reference to redeem the remainder of the commodity (if any) in the form of a second new value note. This provides a convenient technique for transferring the commodity, or a part of the commodity, from one bearer to another. To achieve such a transfer, it is simply necessary for the new bearer (i.e. the receiver) to provide his own public key information for inclusion in the new value note intended for him. If desired, the new bearer can communicate this information directly to the value note issuer. However, it is particularly preferred for the new bearer to provide the original bearer with the new public key information, and for the original bearer to communicate with the value note issuer. The new value note will then be issued to the original bearer who can forward the new value note to the new bearer, for example, as a payment. This is advantageous because it avoids the need for any direct communication between the issuer and the new bearer, and hence ensures complete anonymity. The only party who needs to communicate with the new bearer is the original bearer. In many cases, the original bearer may already be aware of the new bearer's identity; however, this is not essential and, in other cases the original bearer may be unaware of the actual identity of the new bearer. In this respect, the transaction can be equivalent to a cash transaction.

Such a technique achieves complete security for the new bearer even though the new value note will be handled by the original bearer. The new bearer will be able to verify the authenticity of the new value note independently by means of the value note issuer's signature. Furthermore, it will be impossible for the original bearer to attempt to forge the new bearer's signature because the original bearer will only be aware of the new bearer's public key; the original bearer will not be aware of the new bearer's secret key which is required for writing an endorsement signature.

The above value notes may include additional information such as one or more identification codes or strings for uniquely identifying the value note, and information regarding the date and/or time of creation (issuance) the date and/or time of expiry (i.e. the date or time by which the value note must be redeemed if it is to be valid). Preferably, at least some of this additional information (particularly the expiry information) is included as part of the signature calculation, to protect the information from being altered.

The provision of expiry information would be welcomed by financial institutions. It is believed that such institutions may be reluctant to issue value notes of indefinite validity because if would otherwise be difficult to assess an issuer's liability to pay old, unredeemed value notes. Furthermore, the provision of unique identifying information would be welcomed by financial institutions to enable an audit track of a value note to be maintained. This can be used by a bank to verity that the bank is only accepting its own value notes for redemption.

One preferred feature of the invention is that value notes are only issued by one or more value note issuing authorities. For example, where the commodity is money, banks may be the value note issuing authorities. New value notes are not issued directly by the bearers. Therefore, the value note issuing authorities can maintain tight security control over the value notes, and can detect whether fraudulent payment instructions are being received.

Another advantage to financial institutions is that records of value notes which have been redeemed, or which have expired, do not need to be kept in instant access memory in the financial institution's computer. Generally, to enable fast response to redemption requests, details of all "pending" (i.e. unredeemed, still valid) value notes need to be kept in rapidly accessible memory, which is relatively expensive. However, once a value note has been redeemed, or has expired, the value note details can be transferred to less expensive, relatively slow access archive memory. This can avoid the bank computer, for example, becoming unnecessarily clogged with old information which is only required for archive purposes.

Another preferred feature of the invention is the ability of a bearer to issue a redemption instruction for the creation of a first new value note for at least a proportion of the commodity, optionally a second new value note for the remainder (if any) of the commodity, and optionally a third new value note as a replacement for the first new value note if the first new value note is not redeemed within a predetermined period. In effect, such is a request for a temporary first new value note with a limited life, after which the first new value note is to be considered useless and is to be replaced by the third new value note.

This can provide an extremely useful technique for temporarily making a commodity available to a new bearer. The predetermined period may be as long or as short as desired. For example, the period may be as short as 30 minutes, or less, or as long as a month or more. This technique can also be used to ensure that if, for any reason, a bearer forgets to redeem his value note before its normal expiry date, the commodity will still be retained by the issuance of a new value note with a new expiry date.

A particularly preferred feature is the ability of a bearer to impose payment conditions or requirements in the temporary value note which must be met before the temporary value note can be redeemed. Therefore, a new bearer will not only have to redeem the temporary value note before it is due to expire, he will also have to meet the further requirements imposed by the original bearer.

Again this provides an extremely useful technique for a transaction between for example, a buyer and a seller. The buyer can instruct the creation of a temporary value note in favour of the seller to demonstrate to the seller that sufficient money is available, but subject to certain conditions which the buyer may wish to impose. Generally, the conditions will be verifiable by the bank from the information on the endorsed value note, so that the verification can be performed independently of the buyer and seller. Preferably, the requirement and the verification are signature based.

For example, one condition might be that the buyer himself has to "counter-sign" the temporary value note before it can be redeemed by the seller. This is distinct from a "normal" value note in favour of the seller as described above, which only requires the signature of the seller for redemption. With the additional requirement for a counter-signature, the buyer can delay his signature until, for example, he has received goods, or a contract to supply goods, or money from the seller. By counter signing, the buyer confirms that the transaction has been completed, and he makes the temporary value note redeemable.

As an alternative example, the buyer may include a receipt, guarantee or other information message in the temporary value note which the seller will have to endorse with his signature as part of the redemption process. This provides a technique for obtaining a receipt from the seller which has been endorsed by the seller. It also enables techniques for secure transaction or swapping of value notes, as illustrated in the preferred embodiments.

In general the additional requirements which can be specified in a value note are not limited only to signatures from the parties directly involved, but may also include signatures from other parties. The signatures need to be verifiable by the money handling authority before the option note can be redeemed.

Preferably, the message is encrypted by the buyer and/or seller so that the bank or other value note issuing authority is unable to read its contents. Such encryption can provide the buyer with a guaranteed receipt for the transaction, but still preserve the anonymity of the transaction. The bank is able to verify that the encrypted text matches the signature information even though the bank is unable to read the receipt information directly.

As an example, once the buyer has prepared the text message (for example, the receipt message) for the option note, the buyer may "blind" the message by applying a blinding function before the message is signed. A blinding function is a function which renders the message unreadable to person without knowledge of the blinding key but, the blinded message retains its original relationship with the signature, which is also blinded. In other words, the blinding function encrypts the message without affecting the verification of the endorsing signature when the signature is also blinded. One example is to multiply the encrypted message by a chosen blinding factor.

If a blinded message is used, and it is desired that the seller be able to read the blinded message, then it is necessary to include the blinding factor as part of the information on the option note. This is done by encrypting the blinding factor in such a way that only the seller can decrypt it. For example, the seller's public signature can be used to encrypt the blinding factor; only the seller with the knowledge of his own secret key will be able to decrypt the blinding factor. If the blinding factor is encrypted as numeric information, then it should be double encrypted, since it may be possible to ascertain the blinding factor from a single encryption. However, if the blinding factor is encrypted as a text string, then it should only be necessary to encrypt this once, since it will then not be possible to decrypt the text string.

Blinding is a useful feature because, when the value note is transmitted to the bank (or other money handling authority) in blinded form with a blinded signature, the bank only has knowledge of the signature in blinded form; the bank does not have knowledge of the original signature. In future, if the bank is presented with the value note in unblinded form, it will be impossible for the bank to recognise the value note, and to associate it with the earlier transaction. Thus, transaction anonymity can be ensured, such that the bank will not be able to construct its own secret tracking of value note transactions.

The use of temporary value notes (or "option notes") also opens the possibilities for secure and guaranteed transactions, without necessarily revealing the identification of both parties. In particular, when used over public communication systems, such as the Internet, value notes can offer a secure payment or transaction framework without the risk of revealing a person's personal information, such as the person's credit card details.

It will be appreciated that the invention achieves distinct technical advantages in enabling secure and anonymous transactions to be conducted openly over a public communication system, such as the Internet. In one aspect the invention may be regarded as a protocol defining the manner in which value note information is presented. The above advantages are a direct result of the manner in which information is arranged to form a value note, rather than the content of the information itself.

The use of blinding, as described above, is not limited only to specific message information within a value note, but can be used to blind an entire value note, for example, to conceal the note's contents from a bank, or other handling authority. For example, the initial value note may be made indecipherable by the bank, but the bank could issue a guarantee for the value note up to a certain agreed value (in the same manner as a guarantee for a conventional check up to a certain value). The signature relationship which the blinding function preserves, can ensure that the value note is verifiable, even though the contents might not be understandable until the value note has been unblinded.

It may be difficult or even impossible to maintain an audit track of blind value notes. The bank or other issuing authority may, of course, issue its own serial number for the note, to maintain auditability, but such information would have to be provided in the form of a separate header or packet of information which is not subjected to the blinding and un-blinding algorithms.

Another alternative might be to require the presence of a signature from another party (i.e. not the buyer, seller, or the original issuing money handling authority), as an additional requirement before a value note can be redeemed. This can be useful for effecting transactions between two parties using different money handling authorities. A signature from one money handling authority may be required before one value note can be redeemed, as evidence that another value note has already been redeemed, for example, in exchange. This facility can also enable complicated or "chain" transactions between three or more different parties, rather than merely between two parties (e.g. a buyer and a seller as discussed above.)

In addition to the ability to be able to divide the value in a value note, the present invention can also enable a number of different value notes to be consolidated into a single value note. In order to do this each value note can be endorsed with the payment instructions to consolidate with others, and the value notes transmitted to the money handling authority with a blank value note to embody the consolidated value.

It will be appreciated that, in general, the success of a consolidation operation depends on the successful authentication of a plurality of value notes (rather than merely a single note, as in previously discussed operations). The whole operation may fail if any one value note fails authentication. In such case, it is important that the other value notes are not marked as "spent"; this is a risk because the bank would have received at least some satisfactory value notes bearing instructions and a correct endorsing signature.

To address this, in a particularly preferred form, a shorthand method of consolidation operation can be performed without having to append separate instructions to each value note, and transmit the full information from each value note. In the preferred form, the common information from the separate value notes is transmitted as a common block, with a set of common instructions. A requirement may be that the value notes have to bear the same bearer public key (it will be appreciated that, although in many cases, the bearer will choose the same public/private key for all his value notes, this is not essential).

The shorthand method thus provides the flowing advantages:

(a) the amount of data needed to be transmitted is reduced;

(b) there is only one set of instructions, which simplifies processing of the value notes;

(c) should the operation fail, the bank will not have to return all of the value notes, together with a failure message, thereby further reducing the amount of data requiring transmission; and (d) should the operation fail, there will be no risk of any individual "pending" value notes remaining at the bank with valid signatures, which might otherwise be marked as "spent" or, at least, already validly received, at the bank.

It will also be appreciated that combinations of consolidation and division (or "spending") operations may be carried out, for example, "consolidate notes A, B and C; from the total, issue a new option note D, give change (if appropriate) on a new note E, and (if appropriate) issue a further note F to replace D if D is not redeemed by a certain date (or time)". It will be appreciated that the new note D may be the name of a different payee, e.g. a seller to whom the money is to be transferred.

A bearer's value notes may be handled by automatic software which runs on the bearer's personal computer. In a preferred form, the value notes are grouped within a software "wallet", with each note in the same wallet being based on the same public/private key information. The bearer may have two or more software wallets, to accommodate different public/private key information.

In various aspects the invention provides methods and apparatus for handling value notes, and representations of value notes.

In one related aspect, the invention provides a method of providing a value note comprising: providing first information representative of public key information for a bearer; providing second information representative of a commodity represented by the value note; and calculating third information representative of an issuer's signature dependent on the first and second information and verifiable by means of public key information for the issuer.

In another related aspect, the invention provides a method of handling a value note, comprising: receiving a value note comprising first information representative of a bearer's public key, second information representative of a commodity represented by the value note, and third information representing an issuer's signature which can be verified by information including the first and second information and public key information for the issuer; providing redemption instruction information for the value note; and providing a bearer's signature which is dependent on the payment instruction information and is verifiable from said first information.

In a yet further related aspect, the invention provides a method of handling a value note with associated redemption instruction information and bearer signature information, the method comprising performing at least one verification prior to redeeming the value note in accordance with the redemption instruction information, the verification comprising: verifying that bearer signature information in the value note matches information including at least the payment redemption instruction information using public key information for the bearer presented in the value note.

In a further related aspect, the invention provides a record carrier on which is recorded value note information including: first information representative of public key information for a bearer or from which public key information for a bearer can be verified; second information representative of a commodity represented by the value note; and third information representative of an issuer's signature which is verifiable from information including the first information, the second information and public key information for the issuer.

In a further related aspect, the invention provides a signal representing a value note and comprising: first information representative of public key information for a bearer, or from which public key information for a bearer can be verified; second information representative of a commodity represented by the value note; and third information representative of an issuer's signature which is verifiable from information including the first information, the second information and public key information for the issuer.

In a further aspect, the invention provides a method of providing redemption instruction information for one or more value notes, the method comprising: providing a list of identification information for identifying each existing value note to be used in the transaction; providing a list of redemption requests, each request including information representing a result of the transaction, and a commodity value associated with that result; providing a signature information representing a bearer's signature which is verifiable from the information in the instruction and/or from information in said value notes, and public key information for the bearer.

The above aspect can provide a standard protocol by which payment request, consolidation requests, and option note requests can be made, either individually or in combination. Such a protocol can also simplify the processing needed at the money handling authority to process the requests.

At least one redemption request may include a request to issue a new value note.

Preferably, the method further comprises communicating the instruction information, with or without the individual value notes referred to in the instruction information, to a money handling authority. The individual value notes do not have to be transmitted with the instructions if not desired, since the money handling authority should already have access to all of the information in each value note from their own records of value notes awaiting redemption.

A further aspect of the invention relates to preventing a malicious use of value notes, or other electronic representations of a commodity, by repeated attempts to redeem the commodity immediately after issuance. For example, in the case of a value note, a malicious user might try to repeatedly redeem a new value note immediately after issuance in order to try to disrupt the bank's computer. To prevent this, the invention proposes a method wherein an electronic representation of a commodity is issued by an issuing authority, the electronic representation including information representing a time and/or date from which the electronic representation is available for redemption, said time and/or date being later than the time and/or date of issuance, whereby the electronic representation is not available for redemption immediately after issuance. This method is especially suitable when used with a value note as defined hereinbefore, but is also equally suitable for use with other forms of electronic money (or electronic representations of another commodity).

A yet further aspect of this invention relates to providing different levels of guarantee for an electronic representation of a commodity. In accordance with this aspect, the invention proposes an electronic representation of a commodity, the representation including first time and/or date information representing a time and/or date up to which the electronic representation is guaranteed, and second time and/or date information representing a time and/or date later than the first time and/or date and up to which the electronic representation may still be valid but without a guarantee.

Such a facility is useful for issuing short-term guarantee representations which may still have a longer life than the length of the guarantee. This aspect is especially useful in conjunction with value notes, and can enable the bank (or other money-handling authority) to cancel value notes which are outside the guarantee period if, for example, the bearer's secret key has been compromised, or if the issuer's key has been compromised. In the case of value notes representing digital certificates (discussed as one detailed embodiment), the dual date facility can enable short term guarantee certificates to be issued.

If a bearer is in possession of a value note (or other electronic representation) which is outside its guarantee term, this does not automatically render the value note suspicious. It merely means that the bearer should check the validity of the value note with the issuing authority before attempting to redeem the note.

In another related aspect, the invention proposes an electronic representation of a commodity, the representation including first time and/or date information representing a time and/or date from which the electronic representation is guaranteed, and second time and/or date information representing a time and/or date earlier than the first time and/or date and from which the electronic representation may still be valid but without a guarantee.

This is similar to the previous aspect in many respects. Preferably, the two aspects are used in combination to define a first time and/or date window in which the representation may be valid but is not guaranteed, a second subsequent time and/or date window within which the representation is guaranteed, and a third subsequent time and/or date window within which the representation may be valid but is not guaranteed.

A yet further aspect of the invention relates generally to encrypting information in such a manner that it is decryptable by another authorised party, and is also "verifiable" by a third party even though the third party is not able directly to read the encrypted information. In accordance with this aspect of the invention, this can be achieved by applying a "blinding" function to the information, and including an encrypted version of the blinding key of factor.

If the message is received by an "authorised" recipient (i.e. a party who can decrypt the encrypted blinding key in the message), then the recipient can decrypt the blinding key and use that information to "unblind" the blinded information. Even when the information is unblinded, the relationship with the signature is preserved, such that the unblinded message can be verified against the signature. On the other hand, if the message is received by a non-authorised recipient (i.e. a party unable to decrypt the blinding key), that party will be unable to read the blinded message directly, but will still be able to verify from the blinded information that it matches the signature.

FIG. 1 shows an illustrative example of the main parts of a system for handling value notes. A bank computer 10 is provided for issuing and honoring value notes. Users of electronic money have computer terminals 12, for example, domestic computer systems, which can communicate with the bank computer 10 by means of a public access network, shown schematically at 14. The network 14 may typically allow access to the bank computer 10 through the Internet, or through electronic mail, or other public networks. For brevity, only two user terminals 12 are depicted in FIG. 1; it will be appreciated that the number of terminals which can communicate with the bank computer 10 in this way will be vast. Any computer having access (for example, modem access) to the public communication system 14 may be able to communicate with the bank computer 10.

Digital signatures are used both by the bank and by the users to endorse each value note. In this context, a digital signature is a verifiable code or sequence of numbers which establishes the validity of a piece of text, and acts as evidence that the text has been endorsed by the signatory.

The digital signature S may be expressed as $$S = f1(m,k)$$

where:

m represents message text to be endorsed by the signature; and k represents the signatory's secret key.

The signatory also has a public or authorship key A which may be expressed as $$A = f2(k)$$

The functions f1 and f2 are related such that given a message m, a signature S, and the signatory's public key A, it is possible to verify whether the signature matches the message. On the other hand, the functions f1 and f2 are such that it is impossible to decode a signature or the public key to try to ascertain the secret key. The signature S, the secret key k and the public key A may each consist of one or more numbers, as desired.

As one example, an RSA signature may consist of a number S, and the public key may consist of two numbers N and F, where:

$$S = (M\hat{\ }e) \bmod N$$

$$N = p*q$$

M is an integer result of a one way checksum of the message text m p, q and e are prime numbers chosen by the signatory, with p>q>e, and e coprime to (p−1)(q−1); and F is an integer satisfying $((x\hat{\ }e)\hat{\ }F) \bmod N = x$ for all integers x.

The numbers p, q and e are the signatory's secret key. Only the signatory can easily calculate the signature S to match the text message m, and only the signatory can calculate the public key numbers N and F. However, anyone can verify that the signature S does indeed match the text m with the knowledge of the public key numbers N and F.

The security of the digital signature depends on the length of the number S. It is preferred that this number be at least 100 characters in length, and more preferably at least about 300 characters in length. Even greater security may be desired for a value note issuer's signature, and a correspondingly longer signature may be provided for the value note issuer. The bearer and value note issuer signatures do not have to be the same length.

Figure 2:
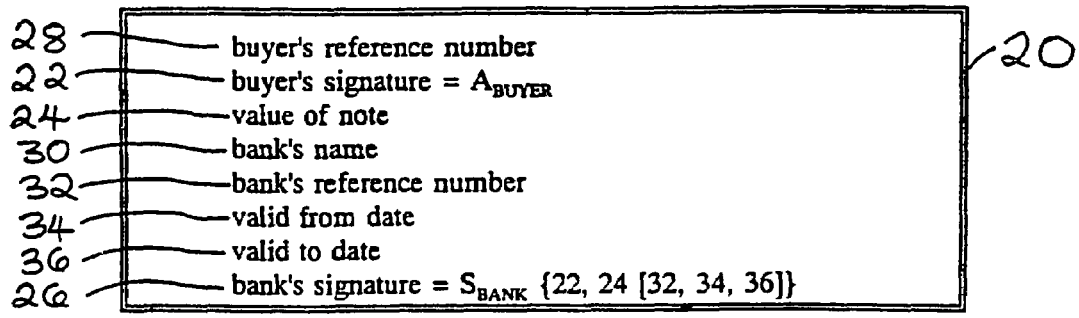
FIG. 2 shows an example of a value note issued to a bearer.

FIG. 2 shows an example representation of a value note 20. Essentially, the value note is a message which includes at least public key information 22 for the bearer, a currency value 24 which the value note represents, and a signature $S_{BANK}$ 26 which endorses the bearer's public key information 22 and the value 24. In this embodiment, the value note 20 also includes a reference number or code 28 selected by the bearer, the name 30 of the issuing bank, a bank reference number or code 32 which uniquely identifies the value note to the bank, a "valid from" date 34 and an expiry date 36 which is the date by which the value note has to be redeemed. As used throughout this specification the terms "valid from date" and "valid to date" or "expiry date" may include time and/or date information, for example, as a time string, or as a date string, or as a combined time plus date string. In one form, the reference code supplied by the bearer, and the reference supplied by the issuer, may be combined (e.g. concatenated) into a single serial number.

The bank's new name information may include an e-mail address for the particular bank computer which issued the value note. As indicated n phantom in FIG. 2, the same bank may employ several autonomous computer systems to increase value note handling capacity. Each system will be able to handle value notes it has issued more efficiently than notes issued by a sister computer system. The e-mail address informs the bearer which computer is responsible for that value note.

Essentially, the value note is a promise by the issuing bank to pay the bearer the currency value 24 on redemption of the value note 20. As depicted in FIG. 2, the bank's signature $S_{BANK}$ may optionally be based on one or more of the further items of information in the value note 20 in addition to the bearer's public key 22 and the note value 24. For example, the further information may include one or more of: the information 32 representing the bank's reference number; the "valid from" date 34; and the expiry date 36.

Figure 3:
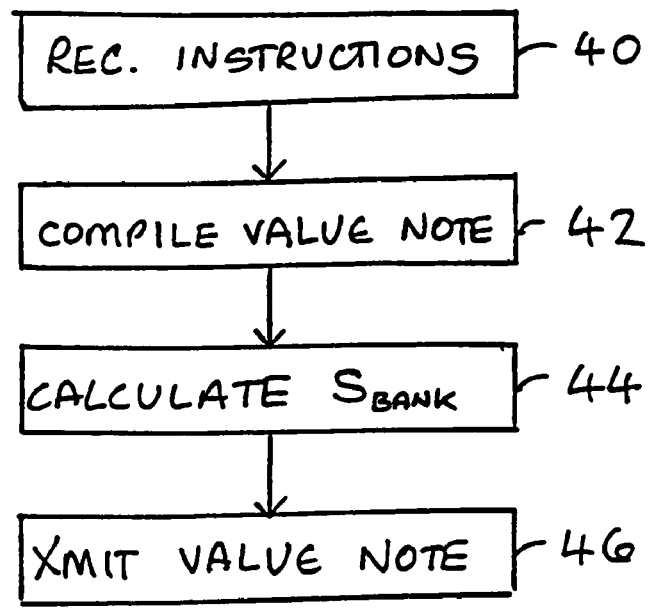
FIG. 3 is a flow diagram of the issuing process.

Referring to FIG. 3, the bank computer 10 issues a value note 20 in response to a request received from a user terminal 12. In order to make the request, the user has to transmit his public key information 22, the desired note value 24 and, if desired, a reference number 28. Referring to FIG. 3, the bank computer receives this request at step 40 and verifies that the user had paid the necessary funds to buy the value note. For example, the user may request a debit from his account held by the bank. At step 42, the bank computer compiles the necessary information for the value note and, at step 44, the bank computer 10 calculates a bank signature based on the information in the value note, using the bank's secret key. At step 46, the bank computer 10 transmits the issued value note through the network 14 to the appropriate user terminal 12 to provide the user with the value note.

When making the request, the user may either send an empty or blank value note with his public key 22, the value 24 and the reference number 28 filled in, or the user may simply send the necessary information in a different form.

Once the user has received the issued value note from the bank computer 10, the user or bearer is then able to use the value note in a transaction with a third party over the public communications system 14. In the following, the current bearer of a value note is referred to as the buyer, and the third party who is to receive funds from the buyer is referred to as the seller.

Figure 7:
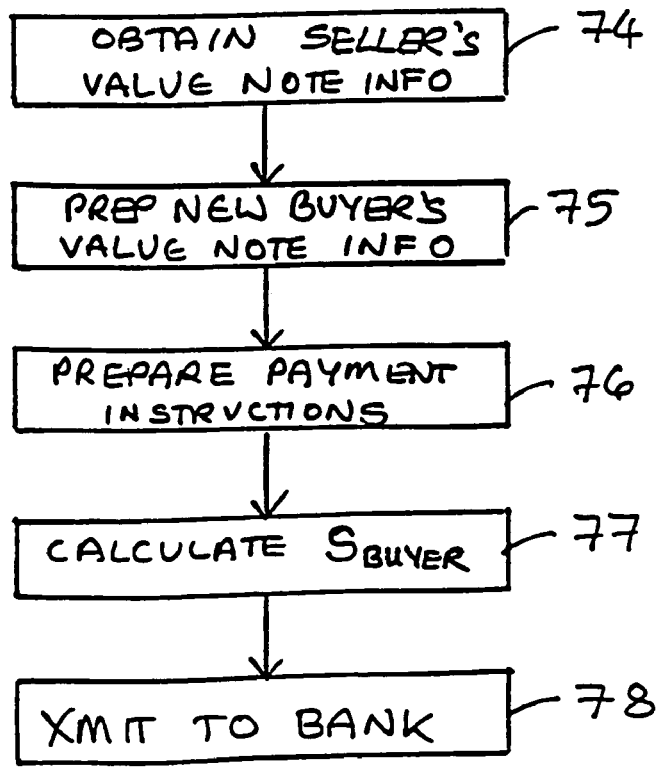
FIG. 7 is a flow diagram of a process for endorsing a value note for a transaction.

The actions performed by the buyer to effect a transfer of funds are illustrated in FIG. 7. These actions may be partly carried out by software in the buyer's computer terminal, under the buyer's instructions.

Figure 4:
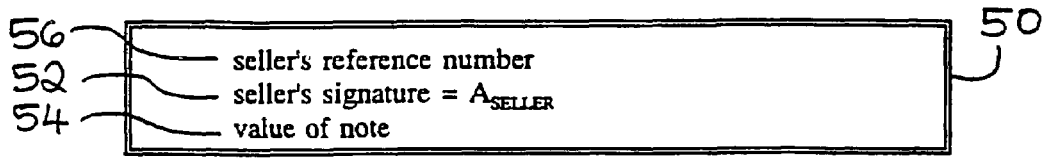

Before the transaction between the buyer and seller can take place, the buyer first obtains sufficient information from the seller to produce a new value note in favour of the seller (step 74 in FIG. 7). As shown in FIG. 4, the information may be transmitted to the buyer in the form of a blank value note 50, and include information representing the seller's public key A$_{SELLER}$ 52, the value 54 of the funds to be transferred to the seller, and a reference code 56 chosen by the seller.

Figure 5:
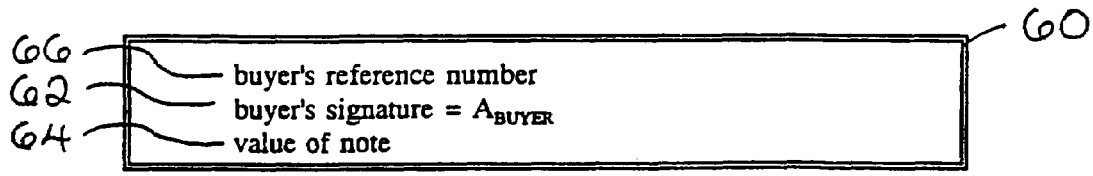
FIGS. 4, 5 and 6 show value notes prepared for a transaction.

Referring to FIG. 5, the buyer also prepares himself a new blank value note (step 75 in FIG. 7) which will represent the "change", i.e. the remaining funds from the original value note 20, once the transaction has been effected. In a similar manner to the seller's blank value note, the buyer's new value note includes information representing a public key 62 for the buyer, the value 64 of the "change", and a new reference number 64 selected by the buyer. In many cases, the public key information 62 provided in the buyer's new value note 60 will be the same as the public key information 22 provided in the original value note 20. However, this need not necessarily be the case. The buyer is free to choose a new secret key and an associated public key 62, and he may decide to do this to provide a greater degree of anonymity.

Figure 6:
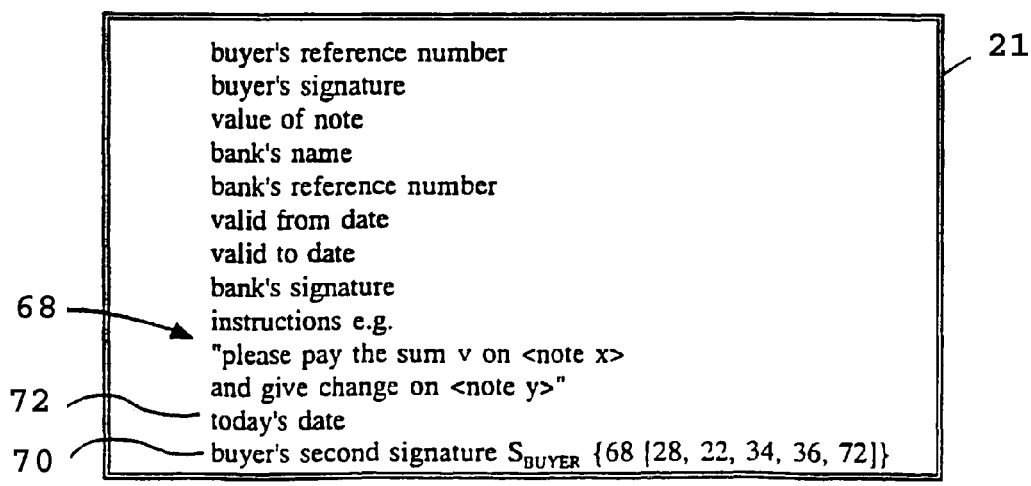

The next step (step 76 in FIG. 7) is for the buyer to append payment instruction information 68 to the value note 20 (FIG. 2), to form new value note 21 as illustrated in FIG. 6. In the present example, the payment instruction information instructs the bank to split the money value of the original value note 20 (FIG. 2) between the new value note 50 for the seller, and the new value note 60 for the buyer. The payment instruction information can identify each of the new value notes 50 and 60 by means of the bearer's reference 56 and 66, respectively. Also in this example, the respective currency values have been included in the seller's new value note 50, the buyer's new value note 60, as well as in the payment instruction information 68. This redundancy may be useful to ensure that no errors or mistakes occur in the new value note and the payment instruction information. However, the information might instead be included only once, either in the payment instruction information 68, the buyer's new value note 60, or the seller's new value note 50. For example, the bank computer 10 would be able to calculate the necessary "change" from the original value information 24 and the payment value 54 from the seller's new value note 50.

Finally, the buyer endorses the payment instruction information 68 (step 77 in FIG. 7) by calculating a digital signature 70 based on the payment instruction information 68 and on the buyer's secret key. As indicated in FIG. 6, one or more of the buyer's reference number 28, the buyer's public key 22, the "valid from" date 34, the expiry date 36 and the current date 72 may also be included in the information upon which the signature calculation is performed, to prevent such information from being tampered with fraudulently.

It is most preferable that the buyer's endorsement signature 70 be based on information including the currency values of the new value notes to be issued, to ensure that this information cannot subsequently be altered. If the currency values have been omitted from the payment instruction 68 and are specified instead on the blank value notes 50 and 60, then the signature 70 should be dependent on the currency value information 54 and 64 specified in the blank value notes.

Having "signed" the value note 21, the buyer would then transmit the endorsed value note 21, the blank new buyer's value note 60 and the blank new seller's value note 50 through the communication network 14 to the bank computer 10 (step 78 in FIG. 7). The endorsed value note, and the blank value notes, may either be transmitted in their entirety or, alternatively, only selected information might be transmitted. For example, since each value note has its own unique identification number, the entire information in the value note does not itself need to be transmitted back to the issuing authority (the issuing authority will be able to access such information from their record copy of the original value note and, indeed, would normally access this information to verify the redemption instructions). In its briefest form, the instructions may be transmitted without any information from the original value note apart from the identification number. The instructions may also simply include a reference number and public key for each new value note to be generated (instead of transmitting a whole blank value note). An instruction format using such "reduced" information is described in more detail later; the current description is to be interpreted to cover using such "reduced" or short-hand information as well as transmitting full information. It is emphasised that the use of "reduced" information does not limit the information which can be included in the endorsing signature, since this can be based on all of the value information (such information being available to both the bearer and the money handling authority).

Figure 8:
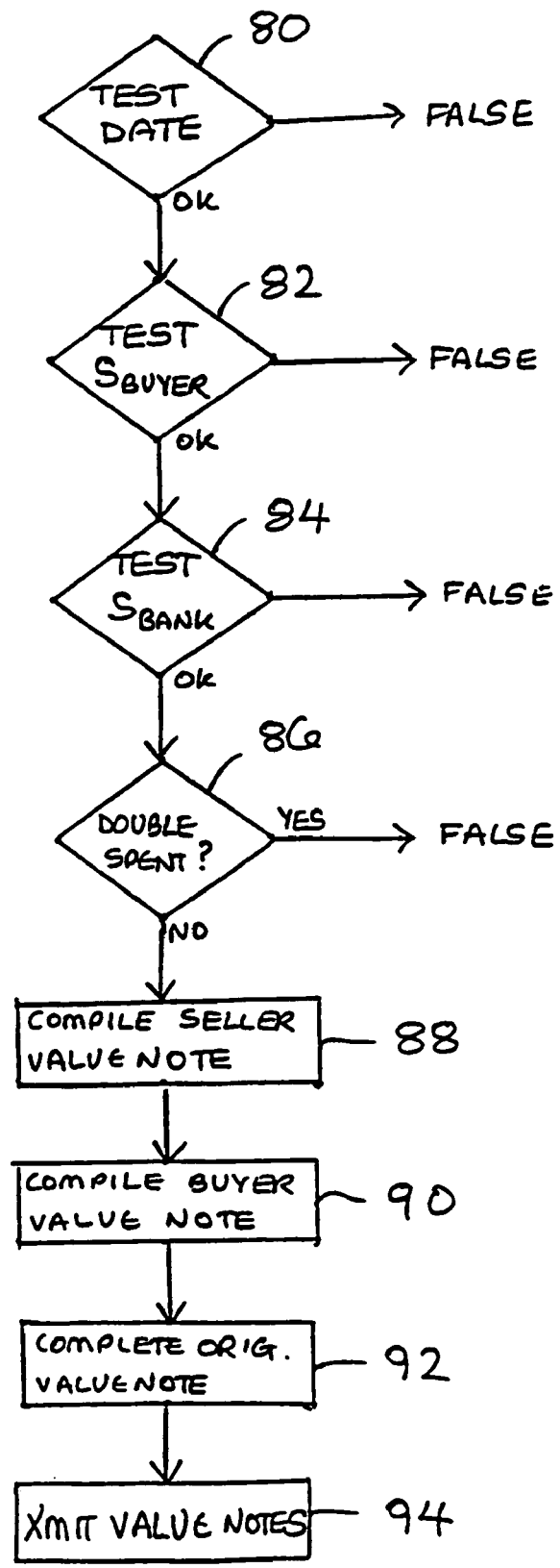
FIG. 8 is a flow diagram of a process for redeeming a value note.

Referring to FIG. 8, the bank computer performs a number of verification tests upon the endorsed value note 21 (FIG. 6) to determine its authenticity. The order in which the tests are performed is not important; if any one of the tests fails, then the bank computer 10 may treat the value note as being "false", and need not honor the value note.

In this example, the bank computer 10 first performs a test 80 upon the "valid from" date information 34 and the expiry date information 36 in the received original value note 20 (FIG. 2), (or in the copy of the note already held by the bank computer if the original note is not returned) to ascertain whether the current date falls within an allowable window.

Assuming that the date is satisfactory, the bank computer 10 next proceeds to step 82 at which the buyer's signature 70 is analysed. By using the public key information 22 originally presented in the value note 20 (FIG. 2), the bank computer 10 attempts to verify that the signature information 70 matches the information in the endorsed value note 21 upon which the signature information 70 is based. As explained above, the signature information 70 depends at least upon the payment instruction information 68, and may also depend on other predetermined information in the value note.

The test 82 will only be satisfied if: (i) the signature information 70 has been correctly calculated using the same secret key as that used to drive the public key information 22; and (ii) the information protected by the signature 70 (i.e. at least the payment instruction information 68) has not been altered. If the payment instruction information 68 (or the other information protected by the signature 70) has been altered, or if the signature 70 has itself been forged, then the information will fail the buyer's signature test 82.

Assuming that the buyer's signature test 82 is satisfied, the program then proceeds to step 84 at which the bank computer 10 attempts to verify the original bank signature 26 against the information protected by that signature (in particular the buyer's public key information 22 and the original note value 24). The test 84 can be performed by using the bank's public key (in the same way as the test 82 described above). Alternatively, the bank computer 10 may simply repeat the original signature calculation to test whether an identical signature 26 is produced. If the test 84 fails, then this is an indication that at least some of the original information in the value note 20 has been altered (possibly either the original value information 24 or the original buyer's public key 22), and that the value note 20 should not be honored. This test is not necessary if only instruction information is supplied by the bearer for redemption.

If the above tests 80, 82 and 84 are all satisfied, this is indicative that the completed original value note 67 has not been tampered with, and that the buyer is the correct bearer authorised to redeem the value note. The next test 86 performed by the bank computer 10 ascertains whether the value note 67 has previously been redeemed. This test can be performed by comparing the bank's reference code 30 (FIG. 2) in the completed original value note 67 with a list maintained in the bank computer 10 of each value note and the date, if any, of redemption. The purpose of this test 86 is to prevent a user from "double spending" a value note.

Figure 9:
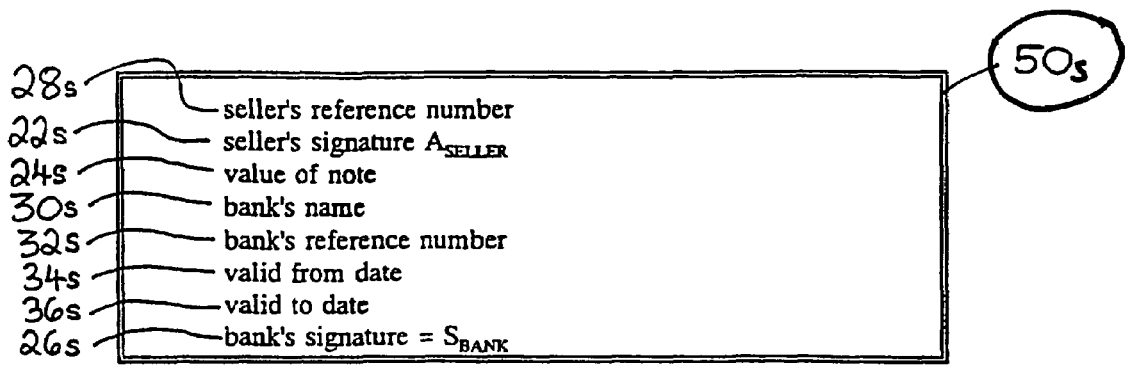
FIGS. 9, 10, and 11 show new value notes issued as a result of the redemption process.

Assuming that the value note 67 has not previously been redeemed, the bank computer records the current date as the date of redemption, and proceeds to step 88 at which the new seller's value note 50 is completed and a bank's signature added to authenticate the new value note 50 in the same manner as that described above for the value note 20. The completed seller's value note is illustrated in FIG. 9. This is similar to the original form of value note 20 shown in FIG. 2, and the same reference numerals (followed by the letter "s") are used to indicate the corresponding information in the completed value note 50s.

Figure 10:
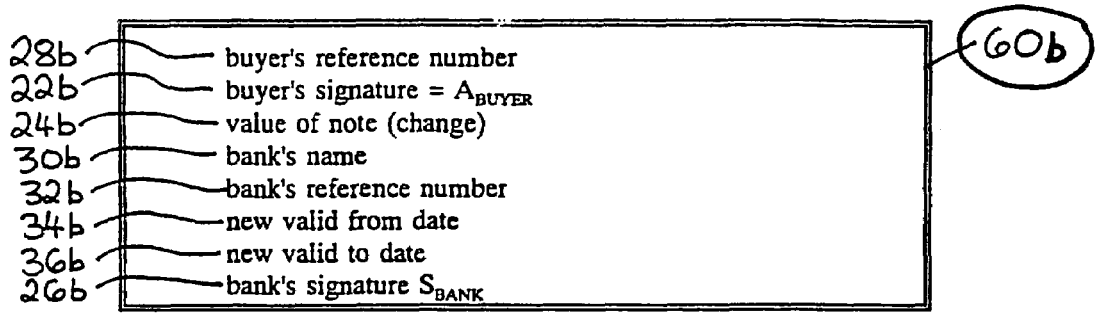

Similarly, at step 90 (in FIG. 8), the new buyer's value note 60 is completed and a bank's signature is added to authenticate the new buyer's value note 60. The completed new buyer's value note 60b is illustrated in FIG. 10, and corresponding reference numerals (followed by the letter "b") denote the value note information described previously.

Figure 11:
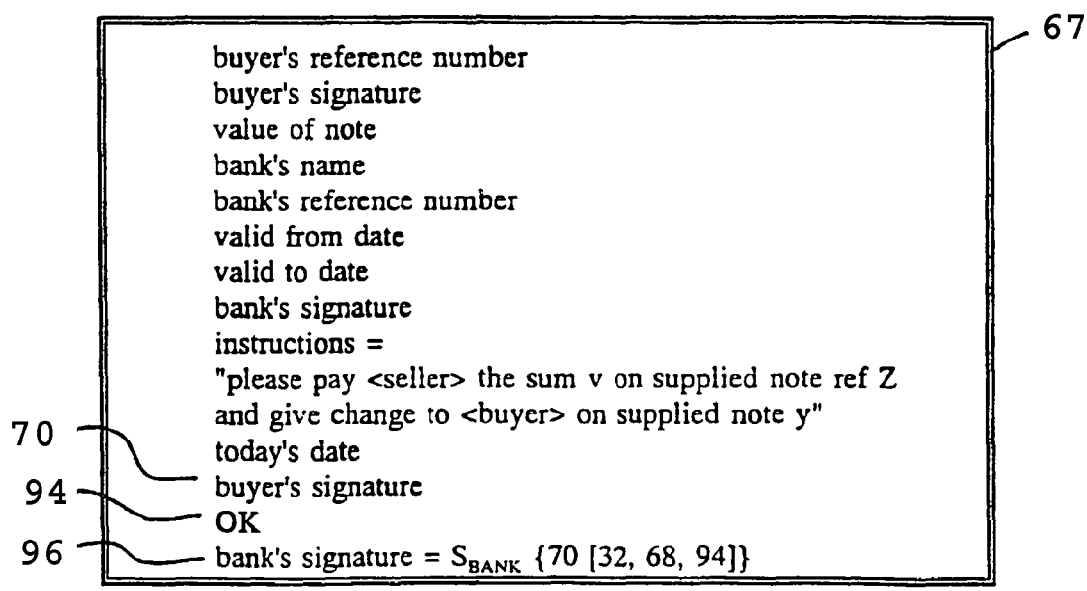

At step 92 (in FIG. 8), the bank computer 10 completes the endorsed original value note 21 to provide a receipt of the transaction to the buyer. The completed original value note 67 is illustrated in FIG. 11. This includes an "OK" message indicated at 94, and a final bank signature 96. The final bank signature is calculated based on the text of the buyer's signature 70 described above, and acts as a guarantee that the buyer's signature cannot subsequently be altered, either by the bank or by the buyer, should a dispute arise later. As indicated in FIG. 11, the final bank signature 96 may also be based on other information in the value note 67, such as the "valid from" information 32 (FIG. 2), the payment instruction information 68 (FIG. 6), and the "OK" message 94, to prevent alteration of those items of information in case of a dispute later.

Finally, at step 98 (in FIG. 8), the bank computer 10 transmits the new seller's value note 50s, the new buyer's new value note 60b and the completed original value note 67 to the buyer's computer terminal. This is the computer terminal from which the original transaction instructions were transmitted to the bank computer 10. Upon receipt of the new value notes, the buyer would keep his own new value note 60b for further use, and forward the new seller's value note 50s to the seller as payment. The buyer's computer terminal would typically communicate with the seller's computer terminal through the public communication system 14 to transfer the seller's value note 50s.

It will be appreciated that the above technique offers complete security even if the buyer and the seller do not know or trust each other, and even if the electronic messages are intercepted by another party.

In particular, if a thief intercepts the value note and attempts to redeem the value note with a forged signature, then the value note will fail the bank computer's test 82, since only the true bearer of a value note is able to calculate a correct signature with the knowledge of his secret key.

If a thief attempts to substitute his own public key in place of the original public key information 22 (in order to forge a "verifiable" bearer signature 70), then the value note will fail the bank computer's test 84 since the public key information 22 will no longer match that endorsed by the original bank signature 26.

Should an unscrupulous buyer attempt to forge a value note to send as payment to a seller, the seller would be able to identify this as a false value note from a simple "verification" of the forged bank signature 26 which will not match the public key information for the bank.

Any value note can be copied or distributed without increasing the liability of the bank, since the bank only has to honor the first valid presentation of a value note endorsed with payment instructions and a correct signature. The bank cannot avoid honoring at least one presentation, since it will not be able to demonstrate any other payment instructions except those correctly endorsed with the bearer's signature. If the bank is queried over the disposal of any issued note, the bank will be able to issue confirmation copies of the receipt value note 67 (FIG. 11), the seller's value note 50s (FIG. 9) and the buyer's replacement value note 60b (FIG. 10) without increasing its liability.

It will further be appreciated that the buyer and the seller can remain completely anonymous to the bank. The buyer's secret key(s) and the seller's secret key can be chosen quite arbitrarily so that they do not identify the buyer or the seller. In the example described above, the seller does not need to communicate directly with the bank computer 10, which further isolates the seller from the bank.

The only transactions which are not anonymous are:

(i) an initial transaction in which a payer is "buying" a new value note from an issuing bank using a payment from his bank account (discussed above with reference to FIG. 3); and (ii) a final transaction in which a payee redeems a value note by including payment instruction information 68 to pay the value note into a bank account.

In either of the above, the identity of the bearer will be known to the bank because the bearer has to supply details of his bank account to the bank to effect the payment.

Apart from the above, a bearer of a value note does not need to be registered with or even have an account with the issuing bank. A user can receive and transfer value notes with the anonymity and flexibility of cash in his hand.

A bearer does not even need to provide any personal information to the bank at all. The only information which a bearer is obliged to supply is his public key information, which can be selected or generated arbitrarily.

A further advantage is that the value notes permit division of the funds independently of the denomination of the funds. For example, a value note may even be calculated to fractions of a cent. A bearer may also combine two or more individual value notes into a new accumulated value note by a similar process to that described above. Essentially the bearer would endorse each individual value with the appropriate redemption instructions and send the collection of the individual value notes to the bank computer with a new blank value note to be returned with the accumulated value. It will be appreciated that electronic money or other commodity can be stored much more efficiently by value notes than by other conventional techniques, such as by e-cash where a number of indivisible electronic coins each need to be stored separately. The ability to divide, or to combine, value notes therefore provides extremely important advantages.

Should the user's computer 12 lose contact with the bank computer 10 during a transaction (such that the user does not know whether the transaction has been completed), the user can simply re-transmit the data to the bank computer 10 without increasing either his own liability, or the bank's liability.

In the above, the "valid from" information in the new value notes 50s and 60b may simply represent the instantaneous date and/or time of issuance, as a record of the date and/or time of issuance. Alternatively, the "valid from" information of one or both of the new value notes 50s and 60b may be set a predetermined interval after the time and/or date of issuance. This is equivalent to "post-dating" the value note so that it cannot be used again for immediate redemption. A possible advantage of this is that it can prevent a malicious user from repeatedly submitting new value notes for redemption immediately after issuance, and thereby try to overload the bank's computers. The interval may, for example, be from a few minutes, or less, to a day, or longer, as desired.

As a modification of the above embodiment, the buyer may send payment instructions to the bank computer 10 to issue a temporary value note with a limited life. This is illustrated in FIGS. 12 to 17.

In a similar manner to that described previously, a buyer first obtains an empty or blank value note 50 from the seller (FIG. 4). However, the buyer now prepares himself two new value notes, each of the form shown in FIG. 5. The first of these will provide the change from the transaction in the same manner as that described previously, and the other will provide a replacement value note for the buyer if the seller fails to redeem the temporary value note within the set period.

Figure 12:
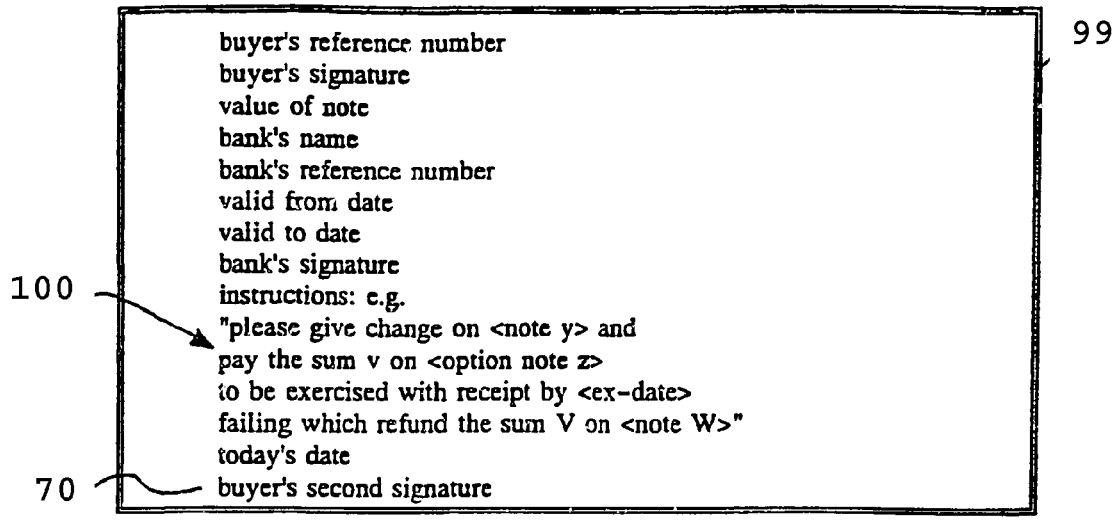
FIG. 12 shows an example endorsement of a value note for creating a temporary option note.

Referring to FIG. 12, the buyer appends payment instruction information 100 to the endorsed original value note 67 (FIG. 11), in a similar manner to that described previously. However, the payment instruction information 98 instructs the bank computer 10 to create a only temporary value note 99 (i.e. an option note) having a limited life. The payment instruction information further includes a delayed instruction that, if the option note is not redeemed by the seller by an expiry date selected by the buyer, then the bank computer is to return the funds by issuing a second value note to the buyer.

The buyer then endorses the payment instructions with a digital signature 70, as described previously.

Figure 13:
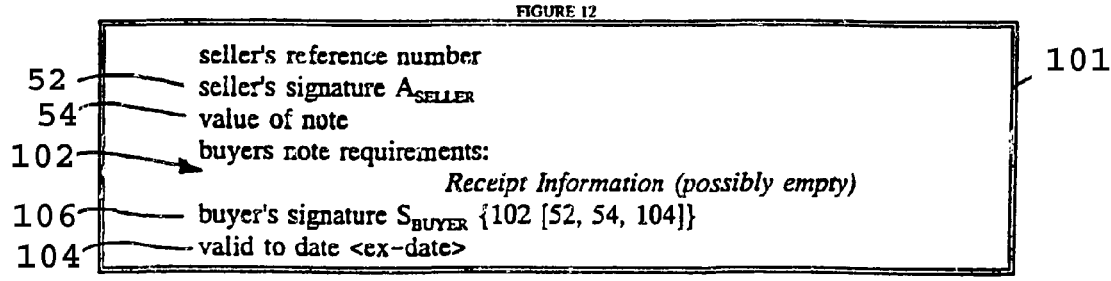
FIG. 13 shows an example blank option note.

Before the buyer sends the endorsed value note 67 and the new blank value notes to the bank, the buyer appends further information to the seller's blank value note 50s (FIG. 9) to transform it into a blank "option" note 101. Referring to FIG. 13, the buyer adds option note information 102 about any further conditions or requirements which the seller must meet before the option note can be redeemed by the seller. Examples of such conditions are described below. The buyer may also include the expiry date information 104 for the option note (although these could also be included by the bank computer 10 (FIG. 1) later if desired). Finally, the buyer calculates a signature 106 based at least on the option note information 102 to endorse the option note information and prevent this from being altered later. As indicated in FIG. 13, the signature 106 may also be based on other information in the option note 101, such as the seller's public key 52, the value 54 of the option note, and the expiry date 104, to protect these other items of information. As explained previously, a reduced set of information may be used, consisting mainly of the redemption instructions, instead of returning a complete value note.

The buyer then transmits the modified seller's value note (i.e. the blank option note 101 in FIG. 13) with the endorsed value note 67 and the buyer's two blank value notes, to the bank computer 10 (FIG. 1).

Figure 14:
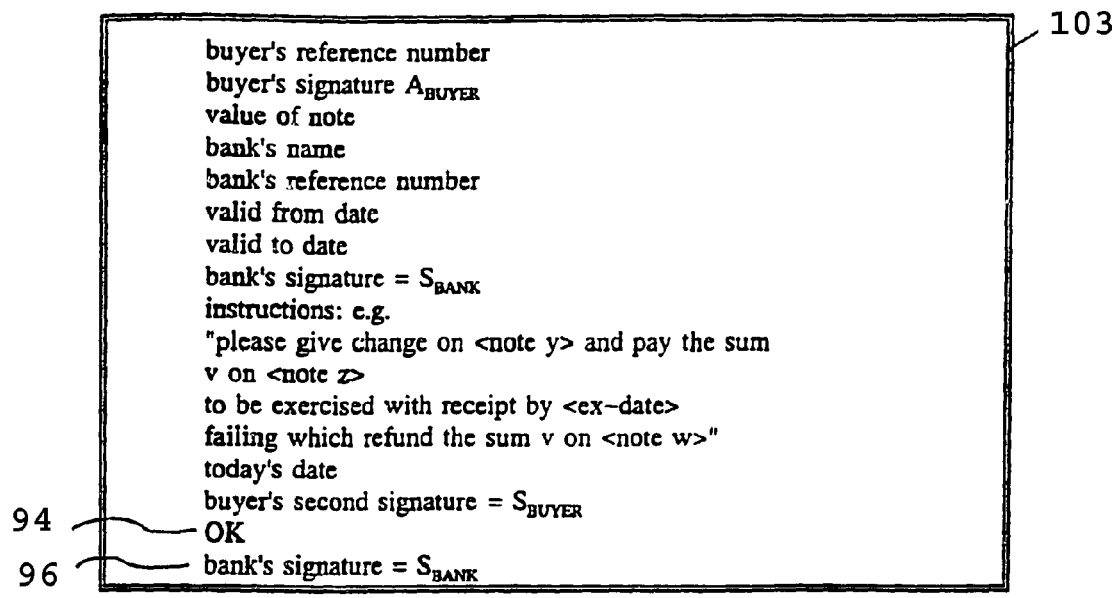
FIGS. 14, 15 and 16 show value notes issued as a result of the redemption process.

FIG. 14 illustrates the completed value note 103 which the bank computer 10 (FIG. 1) returns to the buyer. This is similar to that shown in FIG. 11, and includes an "OK" message 94, and a final bank signature 96 to "sign off" the value note 103.

Figure 15:
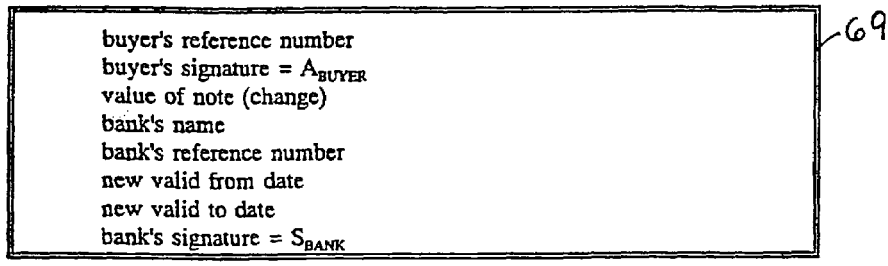

FIG. 15 illustrates the first new value note 69 for the buyer, which the bank computer returns to the buyer as the "change" from the transaction. This is exactly similar to that in FIG. 10.

Figure 16:
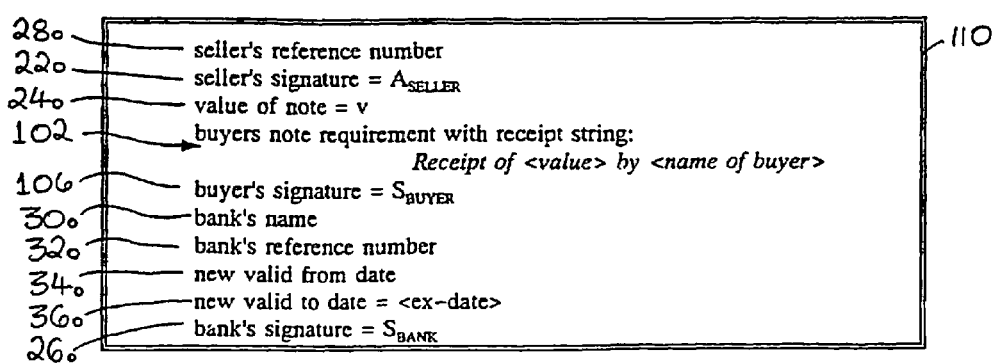

FIG. 16 illustrates the option note 110 returned from the bank computer 10 for the seller. This is based on the option note 100 shown in FIG. 13, and further includes the bank's issuing information included in the other value notes, and denoted by corresponding reference numerals (followed by the letter "o").

If the seller decides to redeem the option note 110, i.e. to take up the "option" presented in that note, the seller first has to meet the requirements or conditions in the option note information 102.

As one example, the option note information may be a requirement to obtain a further buyer's signature before the seller can redeem the option note. This can provide a useful "counter-signing" feature to enable the buyer to finally confirm that the option note may be redeemed.

As another example, the option note information may represent a receipt, or other information, which the seller has to endorse with a signature as part of the redemption process. This provides a useful technique for obtaining a certified receipt for the transaction from the seller.

It will be appreciated that the endorsing of an option note may simply be carried out by returning appropriate redemption instruction information to the money handling authority, with a reference number to identify the original value note/option note. It is not essential to return the entire value note information.

Figure 17:
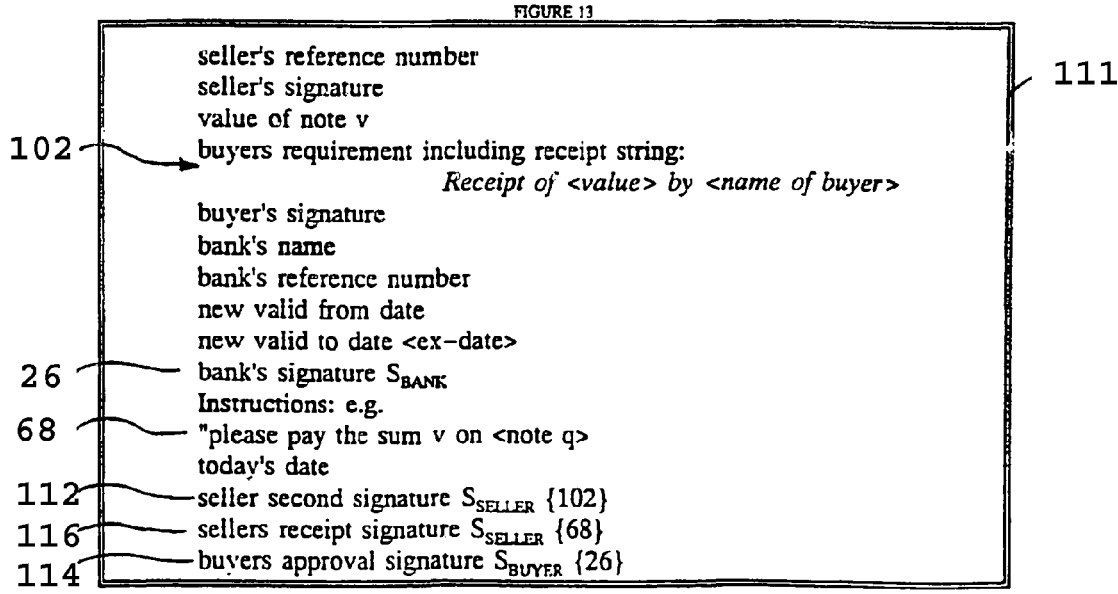
FIG. 17 shows an endorsed option note.

FIG. 17 illustrates an endorsed option note 111 which includes both of the above examples of option note information. The value note includes a signature 112 calculated by the seller to endorse the option note information 102, or at least a receipt string part of the option note information. In this embodiment, the receipt string comprises encrypted text so that neither the bank computer 10 nor bank staff can read the receipt text. This provides absolute anonymity for the transaction at the same time as providing a receipt decipherable by the buyer and seller.

As an example, the receipt text may be encrypted by being "blinded" by the use of a blinding function. This is a function which renders the text unreadable, but which preserves a relationship with a signature, such that the signature can be verified against the blinded text in exactly the same way as described above against unblinded text. An example of a blinding function, which is related to the RSA signature function described hereinbefore is as follows:

By using the known public key information N and F for the seller, the buyer "blinds" the text t by applying a blinding function $T=(t\hat{\ }F) \bmod N$. The seller then selects an arbitrary integer y, and calculates $Y=(y\hat{\ }F)\hat{\ }F \bmod N$. Finally the buyer calculates $M'=M*(y\hat{\ }F) \bmod N$. The message T is the blinded text, and the values M' and Y accompany this.

When this information is sent to the seller, the seller can calculate $y=(Y\hat{\ }e)\hat{\ }e \bmod N$, and $t=(T\hat{\ }e) \bmod N$ to read the blinded message, and can verify that the original checksum M=M'/(y^F) mod N matches the original message t. Then the seller can calculate a signature S on the blinded text T in the same manner as before, as S=(M'^e) mod N.

When the blinded message T, the signature S and the accompanying information M' and F are sent to the bank computer, the bank computer can verify that the signature is valid by verifying that S=(M'^F) mod N. In this manner, the bank can verify that the seller has signed the message to the buyer, even though the bank is not able directly to read the blinded message T.

The buyer can calculate:

$$S/Y \bmod N = (M'^{\wedge}e)/y \bmod N$$
$$= ((M*(y^{\wedge}F))^{\wedge}e)/y$$
$$= (M^{\wedge}e)*Y/Y$$
$$= s \text{(which is the signature for the message } t\text{)}.$$

Even if the bank later sees t and s, along with many other similar texts and signatures of the seller, it will be impossible for the bank to correlate these to the blinded text T and blinded signature S.

The endorsed option note also includes a second signature 114 calculated by the buyer, to meet the requirement in the option note information 102. The buyer's second signature should be calculated using text information if the option note different is from that protected already by the buyer's endorsing signature 106. In this embodiment, the buyer's second signature is based on text comprising the bank's issuing signature 26.

The option note finally includes payment instruction information 68 from the seller to the bank, and a seller's signature 116 endorsing the payment instruction information 68. The seller must complete the option note as described above, and transmit the option note to the bank 10 before the option note expires. Assuming that the seller meets these requirements, then the bank computer 10 is obliged to redeem the option note in accordance with the seller's payment instructions. However, if the seller fails to redeem the option note by the expiry date, then the bank computer 10 will complete the buyer's second blank value note to return the funds to the buyer.

Figure 18:
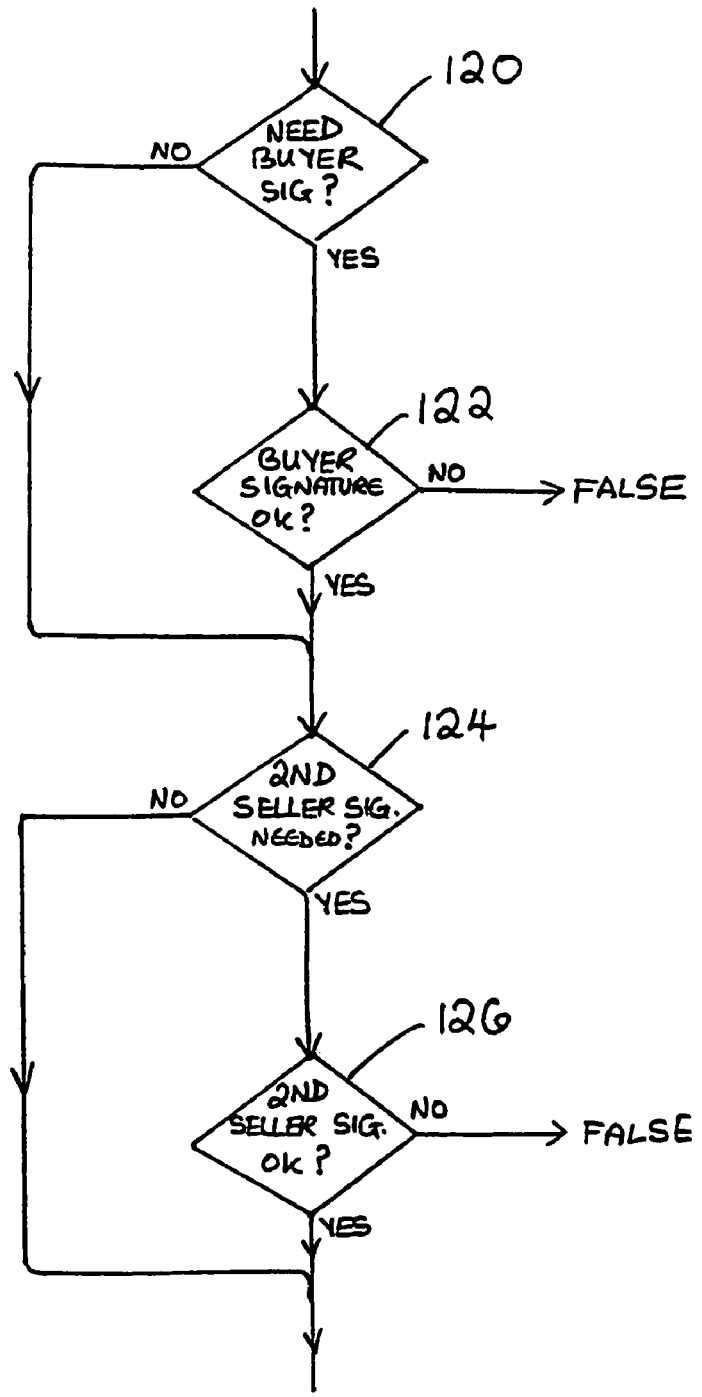
FIG. 18 is a partial flow diagram for redeeming an option note.

FIG. 18 illustrates the additional test steps carried out by the bank computer 10 when an option note is returned by a seller for redemption. These are additional to the date and authenticity tests shown in FIG. 8.

In step 120, the bank computer 10 first tests whether the option note conditions include a requirement for the buyer to countersign the option note. If not, the routine branches to step 124. If the buyer's countersignature is required, the routine proceeds to step 122 which tests whether the buyer's counter signature 114 has been included, and is valid.

After step 122, the bank computer proceeds to step 124 at which bank computer 10 tests whether the option note conditions include a requirement for the seller to endorse a text message (for example, an encrypted receipt message) with the seller's signature. If not, the routine branches past step 126 to indicate that the option note conditions have been met. If a seller's signature is required, step 126 tests whether it matches the receipt text provided by the buyer.

If either of the signature tests at steps 122 and 126 fails, then the routine indicates that the option note is false, or at least has failed the option note conditions, and is not to be redeemed.

After the expiry date of the option note, the buyer may contact the bank computer 10 to enquire about the option note. For example, the buyer may submit a copy of the option note as evidence of authorization. If the seller has not redeemed the option note, the bank computer 10 can issue the new value note to the buyer at that stage to return the funds. On the other hand, if the seller has redeemed the option note, then the bank computer can provide a copy of the fully signed option note (FIG. 17) to the original buyer as a receipt for the transaction (which includes the receipt information presented in the option note information 102).

In addition to the advantages previously described, the option note techniques provide a powerful transaction tool. In particular, the seller cannot deny that he has received the funds from the buyer. In redeeming the option note, the seller can be forced to provide a receipt for the funds which the seller has to sign as part of the option note requirements. By encrypting the receipt message, the details of the transaction receipt can be kept confidential from the bank. However, the bank computer is able to verify whether the seller's signature endorsing the receipt text is valid.

If desired, the buyer can specify which signature the seller has to use, to "test" whether the seller's identity is genuine. For example, if the seller is a company which publishes its public key information, the buyer can insist that the seller uses its signature based on the published public key information. Only a genuine company with knowledge of the secret key to match the public key will be able to correctly calculate a matching signature.

A further advantage is that if the buyer prepares one or more option notes in advance of potential transactions, the transactions can be performed "off-line" from the bank computer. The buyer may, for example, print each of the one or more option notes on paper, and send or hand the option note to the seller. The seller will then have a certain period (for example, a few days) to make contact with the bank computer to redeem the option note (which is guaranteed up to that time). However, if for any reason the buyer decides not to proceed with any of the transactions and keeps the option notes for those transactions, the bank will simply return the funds to the buyer by issuing new value notes when the option notes expire. In this case, the seller never obtains the option notes.

A further advantage is that a buyer and a seller can swap notes in a secure manner. The ability to swap notes may be desirable to further improve the anonymity of the bearer's value notes. A swapping authority could be established on, for example, the Internet to allow bearers to submit value notes for swapping, and to receive replacement anonymous notes in return.

For example, a buyer may write a first option note which requires a further buyer signature before the option note can be redeemed. A seller may write a second option note whose receipt text is the buyer's note, and which requires the buyer's signature to this receipt. The buyer and the seller may then swap the option notes so that the buyer and the seller each possess each other's option note. When the buyer spends the seller's option note, the buyer has to provide the buyer signature on the option note. Through the bank, this signature would be made available to the seller (as receipt information) to enable the seller now to spend the buyer's option note.

Another application for option notes is for a secure transaction, by swapping option notes in such a way that neither party can interrupt the process at some stage whereby they would be able to keep both option notes. In this example, one note may be for currency, and the other note may represent merchandise, such as a value note representation of a share certificate, currency, or an agreement to provide certain goods or services on demand.

The swapping process is similar to that described above for swapping option notes. As the swap has symmetric results, either the buyer or seller can commence the process. Briefly:

(a) Party X provides an option note V to party Y requiring a further signature known only to X before the option note can be redeemed.

(b) Party Y provides an option note U to party X requiring the same X signature, the note U expiring well after V.

(c) if party X uses U, he must provide a signature needed for V, permitting party Y to use V.

(d) the bank for note U will either return U to party Y, or provide the signature for party Y to use note V.

This operation would work even if notes U and V are drawn on separate banks.

In the case where the transaction is to supply goods, only a signed agreement is required to show a judge (or other party responsible for arbitration) that the goods have been agreed to be sold, and have been paid for. In such case, a simpler method can be used:

(a) party X provides a written, but unsigned agreement A to deliver certain goods. This might not be a value note, but merely a textual agreement;

(b) party Y provides an option note V requiring the signature for party X's agreement A;

(c) when party X claims or redeems the note V, he provides to party Y (through the redeeming bank) the signature for A.

This simplified method would not work if A is a redeemable value note, since A could then be redeemed by party X before claiming the value note V, thereby leaving party X without V or A.

Another example of secure swapping or transacting value notes is described below. In this example, instead of two option notes being used, only one option note is required. However, in order to redeem the option a note, one party has to provide evidence that the "swap" value note has been issued, by providing the bank's signature for the "swap" value note. This example also illustrates how option notes can require signatures from other parties even though those parties may not be directly involved in the current value note transaction. The normal use of such signatures is to confirm that certain actions have taken place, e.g. between other parties, or being confirmed by another party, before the option note can be redeemed.

In this example, it is assumed that party A possesses value note X issued by bank I, and party B possesses a value note Y issued by bank J. Two different banks are assumed in this example as a worst case scenario. It will be appreciated that, in accordance with the value note principles, note X includes a public key for A, and value note Y includes a public key for B. The secure swap can be performed as follows:

(a) Party A prepares a value note "shell" Z, which represents the commodity currently represented by note Y, but specifying the public key of A (i.e. as the intended new owner of the commodity), and omitting an issuer signature, since the value note has not yet been issued. In other words, the shell Z is a draft of a value note to be issued (to party A by bank J).

(b) Party A also obtains from bank I an option note O in party B's name, to transfer the commodity represented by note X to party B when party B redeems the option note O. However, a redemption requirement of note O is that it must contain bank J's signature validation the note shell Z, the text of which can be specified in O purely as a message.

(c) Party A communicates the shell Z and the option note O to party B. Party B is then required to redeem the existing note B (drawn on bank J) and to transfer the commodity to a new value Z note based on the shell for Z. In so doing, the bank J will issue Z as a value note, and include an issuer signature for note Z.

(d) Party B should at that stage communicate the note Z to party A as part of the swap. However, if this is not done, party A can still take possession of note Z by other means, as described below.

(e) In order to validate the option note O, party B has to include bank J's issuer signature for note Z. If party B tries to forge such a signature, this will be easily detectable by bank I (who is responsible for handling option note O, and for checking that all of the additional requirements specified in O have been met for the note to be redeemable), since bank J's public key will be publicly known.

(f) If party B does redeem option note O, then bank J's signature can be communicated to party A by bank I (either in the normal course of events, or in reply to an enquiry by party A). Since party A wrote the shell Z, all that party A needs to establish a valid value note Z (drawn on bank J) is the issuer signature.

(g) If party B does not redeem option note O, or fails to do so successfully, then the commodity will return automatically to party A on expiry of note O.

The above procedure can be simplified when both of the original notes X and Y are issued by the same bank. For example, instead of option note O requiring a counter signature, the note O could require the bank to transfer note Y to note Z. This would be very similar to the above, but the bank would treat the message in the option note as instructions to transfer Y to Z, and redeem the option note, as a single operation, rather than performing two separate operations.

Value notes can also be used to represent simply receipts, quotes and invoices. In this case, the "value" in the note represents the value of the commodity which is to be, or has been transacted. The signature is not used to redeem the note, merely to identify the owner and accountability of the notes or invoices.

For example, if a merchant has 100 televisions to sell at half price, the merchant could issue these as 100 value notes each being a quote or offer to sell a television at half price to the first 100 respondents. By using value notes in this way the merchant can ensure that no more than 100 televisions are sold at half price, for example, through agents. The value in each value note would be the opportunity to buy the television.

If a potential purchaser was concerned about the authenticity of the note, or the reputability of the dealer, then the value notes could be left in the control of an established reputable agent, or in the control of a bank.

A value note quote could be redeemed with instruction to take up the offer set out in the note. Then, an option note invoice could be provided detailing the goods, and requiring a signature corresponding to that in a corresponding option note payment. The transaction would then proceed in a similar manner to the swapping value notes/secure transaction techniques described above. The buyer could collect the television (from the vendor or bank) proving his identity by being able to sign instructions to the receipt. The vendor or bank would require the buyer to sign this receipt with instructions stating that he has safely collected the television.

Other value note items could be:

(a) an ATM withdrawal request (where the usage signature provides the bank with evidence that a withdrawal is made, and the initial value note is the offer to withdraw currency from an account, within a limited period of time)

(b) licenses such as driving licenses and television licenses.

In the above examples, the commodity represented by the value note has generally had a fixed value defined in the value note. However, the value might not be fixed, and might not be identified absolutely in the value note. Furthermore, the value might only become determinable at a certain time or date after issuance of the value note.

As an example, value notes may be used to represent spreads of options for share index futures. Financial institutions already trade in such spreads, which essentially define options on a predetermined minimum and maximum value for the index; the spread is worthless if, at the time of redemption or expiry, the index is below the minimum price; the spread is worth the difference between the minimum and maximum values (i.e. the "spread") if the index exceeds the maximum value at the time of redemption or expiry of the spread.

In value note form representing a spread, the "value" of the commodity might typically be a formula, of the form:

$$Value=max(0,min(r,i-e))$$

where r is the range of the spread (i.e. the difference between the maximum and minimum values);

i=the value of the index at redemption, or expiry of the value note; and e=exercise price for the index at purchase of the spread;

max=a function representing the maximum of following values; and min=a function representing the minimum of following values.

A positive spread is a spread which increases in value (up to the range) as the index increases. A negative spread is a spread which decreases in value (from the range to zero) as the index increases. By balancing the number of positive and negative spreads issued, a bank can remove itself from any exposure to the index itself. This is because as the index goes up, the bank's liability to meet positive spreads goes up just as fast as their liability to meet negative spread goes down.

In value note form, the spreads can be traded amongst individuals as well as between individuals and the value note issuing banks. The trading between individuals will result in a market price being set for the spreads. The bank can trade above or below the market price to increase or decrease its exposure to positive and negative spreads as it likes.

Since the value of a spread is never negative (i.e. the value is always between 0 and the range), spreads can be traded anonymously without any unknown liability for a bearer. Accordingly they are ideal for representation as value notes, which additionally support anonymous transactions.

Alternative applications include commodities which provide a return; in such case, the value may be a formula yielding a return curve resembling, for example, life insurance returns, interest rate figures or mortgage rate figures.

The value of the commodity might also simply be identified in the value note as a label, which refers to an "external" established or acknowledged value or formula defining the value, or to an external value for use in a formula defined in the value note.

A further use for value notes is an alternative to digital certificates. Digital certificates are already used for one party to prove his identity to another party. For example, if a party A wishes to check the identity of party B this can be achieved by party B providing a certificate issued by a trusted authority C. The certificate includes details of a public key which party B is known to use. Party B can show the certificate to party A, and then sign a message from A using a signature, to prove his identity.

It will be appreciated that the use of digital signatures in digital certificates is, in some respects, similar to their use in the present invention. However, while the purpose of a digital certificate is to identify the bearer, this is not normally the case with a value note. However, by using a value note approach, it is possible to provide a digital certificate which is transferable or redeemable. This means that if B's public code is compromised, B can have the value note reissued by C with a new key, simply by sending suitable redemption instructions (including the new key) to the issuing authority C.

In order for party A to check that party B is not using such a note which has already been revoked and transferred to a new note, party A has two options:

(a) A can contact C, and ask whether B has reported the note V as compromised. (This option is also available for standard digital certificates); or (b) B can request C to issue an up-to-date value note V which, in addition to being a certificate, provides a short term guarantee of A's identity. Party B can then provide this latest certificate as evidence to A. The advantage of this is that party A does not need to contact C. Consequently, party C need never reveal the identity of party B, since only party B ever communicates with C. In this way party B can keep his identity secret from whom he chooses.

Another application of value notes is to enable interest payments, share bonuses, right issues, lottery winnings and other such payments to be claimed on a value note by signing the note with instruction stipulating only what is to be done with this bonus part. The original value note in this case remains unredeemed, and is still redeemable later for its original value.

This method of signing, without redeeming, the value note can also be used to request from an issuing authority the status of a value note or whether any bonuses have accrued.

The above examples all involve "spending" or division of a value note. However, it is also possible to consolidate a plurality of value notes (for like items) into a single value note. For money, this is equivalent to converting loose change into a higher denomination, to make handling the money easier.

Figure 19:
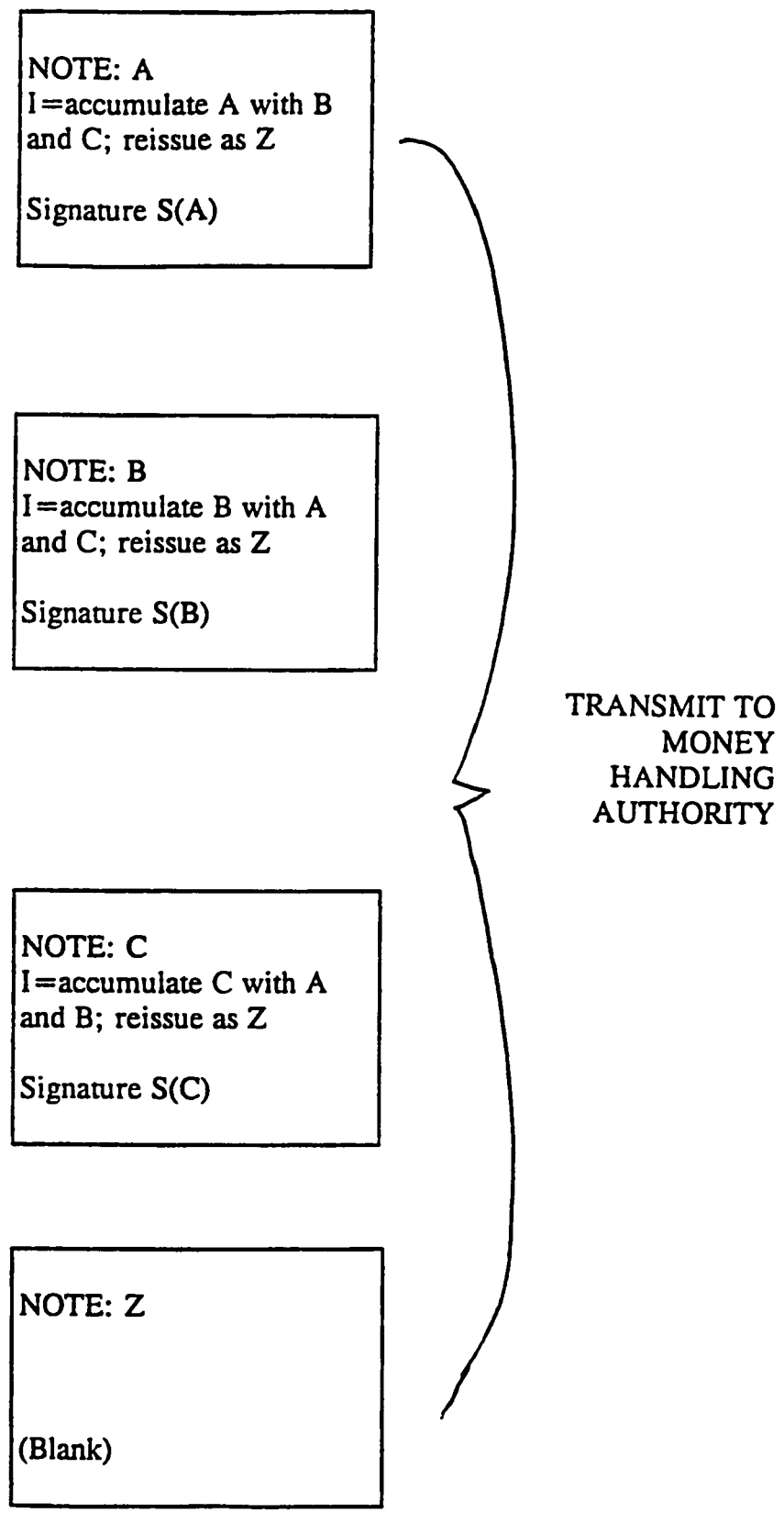
FIG. 19 is a schematic representation of a first type of consolidation operation.

In one technique (illustrated in FIG. 19), consolidation can be performed by sending a group of value notes A, B, C, etc. to the money handling authority together with a new blank value note Z to embody the consolidated values. Included in, or associated with, each value note would be instructions I to the effect that the value in the note should be added to the values in the other accompanying notes (identified by their reference numbers), and that the total value is to be re-issued on the blank value note Z. (For the sake of brevity, FIG. 19 does not show all of the information in each value note, merely the information relevant to the current description). It will be appreciated that, in order to redeem each note as part of the consolidation operation, each individual note requires its own payment instruction I endorsed with an appropriate signature S for the individual value note.

Figure 20:
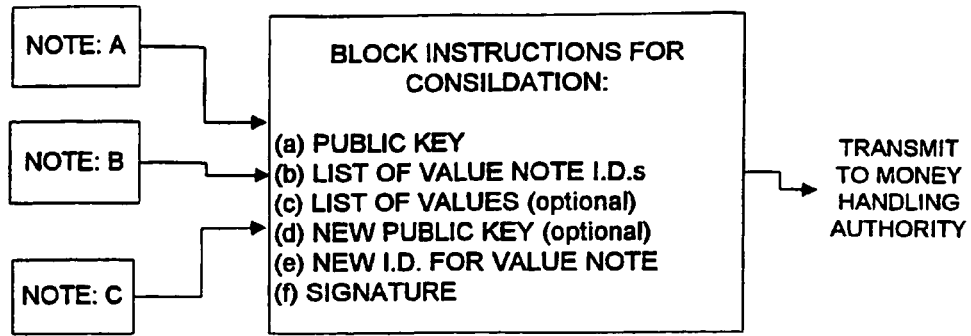
FIG. 20 is a schematic representation of a second type of consolidation operation.

An alternative technique, illustrated in FIG. 20, is to use a short-hand notation to identify or list each value note, and to include common information, including a single instruction message, in a single message block. This is particularly suitable for value notes which have the same public key. The single message block can consist of:

(a) list of serial numbers of notes to be consolidated (b) list of values of the notes (this is optional since the values will be known to the bank, but is preferred to reduce the chances of discrepancies after the consolidated note has been issued);

(c) single instruction message, including the basic details for the new, blank value note (i.e. new serial number (or at least the bearer's part of the serial number), public key information for the new note);

(d) bearer's signature based on (a), (b) and (c) above to secure this information.

The bearer's signature ensures that the information cannot be tampered with during transmission to the bank, and cannot be generated fraudulently. If, in the process of checking the listed notes, the bank finds that one or more notes is invalid (or spent), the bank can refuse to issue the new note and reply instead that a particular value note (identified by its serial number) is invalid.

A significant advantage using the shorthand method is that the consolidation of the notes if performed within a single instruction, and one single signature. As well as reducing the amount of data needed to be transmitted, this means that the bank need only make a single response (even if one or more notes is invalid). The bank cannot somehow approve one half of the transaction, yet fail the other half.

Figure 21:
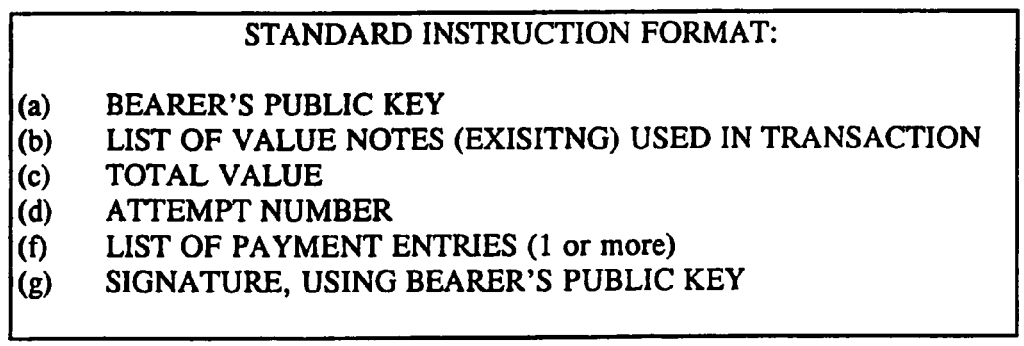
FIG. 21 is a schematic illustration of an instruction format.

FIG. 21 illustrates an instruction format or protocol which has been devised for sending redemption instructions to the issuer (or other money handling authority). Such a format is advantageous as it is able to accommodate division instructions, option note instructions, bank account payment instructions, and/or consolidation instruction all in a single, standard format.

In FIG. 21, the bearer's public key is not essential, but is useful for avoiding the risk of disputes, and for added security.

The list of payments is a list of entries, each entry being either a note payment entry for instructing the issuing of a new value note, or an account payment entry for payment of funds into a bank account. A note payment entry typically includes:

(a) new public key for the note (can be existing public key for Bearer, a new public key for the same Bearer, or a new public key for a different payee);

(b) new serial number (or serial number part determined by the bearer)

(c) value to be paid to the new note.

(d) if applicable, option note details, such as valid-from and valid-to information.

An account payment entry typically includes:

(a) Bank account number (including sort code)

(b) payment reference number (provided by bearer)

(c) value to be paid into the identified account.

It will be appreciated that the payment instructions may include more than one payment entry, thereby allowing multiple transfers to take place within a single instruction block.

The transaction attempt number is a number chosen by the bearer, or by the bearer's software, when redeeming a note, and is similar to transaction number. In the event of an error, or other discrepancy noted by the bank, the bank should include the attempt number in any signed text returned to the bearer. This then associates any rejection with a specifically identified spending attempt from the bearer. It also provides additional security for the bearer, since the bank cannot refuse any transaction without quoting, and signing, the attempt number.

By using the above instruction format, the need to include a copy of each value note in the information sent to the money handling authority can be avoided, if this is desired. The money handling authority will normally keep its own copies of issued value notes (or at least the information included in the issued notes), at least for its own security. By accessing these copies, the money handling authority will have access to the necessary data to verify and complete the transaction. If any discrepancies arise, then the bearer can be requested to supply full copies of the value notes identified in the instruction block.

In some cases, certain notes referred to in an instruction block may require additional signatures, for example, in the case of receipt information, or secure transaction information, exchanged using option notes. Such signatures can be included in the instruction block, together with a reference to identify the value note, and the message text in that value note, on which the additional signature is based. This then avoids the need to supply a complete copy of the value note with the instruction information. For example, each line in the value note may be assigned a line number or code, or each piece of information in the value note may be assigned an identifying code (so that the order of the information in the value note becomes unimportant). By referring to these codes in information associated with the signature, it is possible to ascertain precisely on which information in which value note, or notes, the signature is based.

For example, for a signature based on only part of the information in two different value notes (i.e. not an instruction signature, but merely a signature to countersign information in the value note), the notes being referred to by their serial number: note1 and note2, then the signature identifying information might typically be in the form:

Signature is based on: [PK,{note1(SN,VL,MT),note2(SN,VL,MT)}]

where
  PK denotes the bearer's public key
  SN denotes to serial number of the note
  VL denotes the value of the note
  MT is special message text in the value note (e.g. a receipt message, or an agreement to supply goods, or a message containing a secret key for use in an option note transaction)

In all of the examples described hereinbefore, the value note includes the public key of the bearer, so that the bearer's signature can be authenticated. However, instead of including the public key itself, the value may instead merely contain information which is related verifiably to the public key, for example, by a non-decipherable (one way) function. In that case, when a bearer supplies redemption instructions, these instruction should include the missing public key for the bearer, so that the bank or other money value note handling authority can authenticate the bearer's signature. It will be appreciated that this does not provide a reduction in security, since only the true bearer will be able to supply a public key to match the public-key-related information already in the value note. During processing, the bank would include an additional verification step to check that the public key information supplied in the redemption instructions does indeed match the original public-key-related information.

For example, a purely illustrative one way function could be:

$$f(P) = S^F(n) \pmod{P}$$

where:
  F = the secret key of the bearer n=the serial number of the value note
P=the bearer's public key.

The above function is not very secure, since it may be possible to reverse the function given sufficient information. Other very secure one-way functions have been devised, for example, the algorithms known as "Message Digest" MD4 and MD5, and IDEA.

Although in many embodiments, the main information in the value note will be understandable (e.g. to the bank or other money handling authority), this is not essential. For example, the blinding technique described previously may be applied to the whole value note to conceal the note contents. This would prevent the bank from being able to read the note, and prevent the note from being tracked.

For example, to blind a note, a digest of the note is calculated using a signature digest function:

$$D=d(M)$$

where
D is the digest
M is the value note text (or message text)
D( ) is the digest signature function.

This digest signature is then multiplied by a factor Y, which is computed as $$Y=X^E (\mod N)$$

where
N is the public modulus of the bank
E is the public key of the bank
X is a random number.

The bank then signs the value, yielding the bank issuer signature $B=Z^F \pmod N$ where
B is the blind signature
Z is the blinded digest value D*Y
F is the private key of the bank.

The bearer can then calculate the real signature by dividing B by X (X being known only to the bearer), since $$\begin{aligned} B/X &= (Z^\wedge F)/X \\ &= ((Y*D)^\wedge F)/X \\ &= ((X^\wedge E^\wedge F)*(D^\wedge F)/X \\ &= (X*(D^\wedge F)/X \\ &= D^\wedge F(\mod\ N) \end{aligned}$$

Since any random number X could have been used, it is impossible to tell, at the bank, which signing operation corresponds to which recorded signatures.

Since the bank cannot ascertain what it is signing by issuing the value note, the signature can only be used to guarantee either a fixed value, or any value up to a predetermined maximum guaranteed value, regardless of the rest of the note's content. Consequently, the value note could then consist simply of the public key of the bearer, the value being implied by the bank's signature. Such value notes may be unauditable, and so not favoured by banks. However, an audit track could be established by including a readable serial number, even though other contents are not readable.

Fixed value blind signatures are already used by Digi-cash to effect their e-cash system (described hereinbefore). In the e-cash system the signed information is merely the unique serial number for an e-cash coin.

As part of the present invention, value notes could also be issued for fixed values for blind bank signatures. This would make them similar, in limited respect, to e-cash coins, but provide the stronger ownership properties of value notes owing to their counter-signing requirements.

A swapping centre (similar to that described hereinbefore) can issue fixed value blind bank signature value notes which can have very short expiry terms, for example, an hour or two. These short-term notes would mean that if the swapping centre ceased issuing new notes after 9 pm, it would be quite sure that all notes would be spent or expired by midnight. In this way, it would be able to audit itself from day to day, without knowing the serial number of the notes it issues, until they are redeemed.

If any breach of security occurs, and more notes are redeemed than are issued on any particular day, the damage would at least be limited to only one day's worth of such notes, and the existence of the breach would be discovered very quickly. In contrast with the e-cash system, a breach of security could potentially persist for years before eventually being discovered.

Using blind signatures in swapping centres lends the value note system the benefit of complete anonymity that the e-cash system has, without compromising the required audit trail needed by long term issuers such as banks. This can remove from banks the very worry-some issue of anonymity generation and traceless transactions.

It will be appreciated that the foregoing description is merely illustrative of preferred examples of the invention. The information making up the value notes may be presented in any desired form, and need not be in the same order as that described above.

Although in the majority of the above embodiments the value notes have represented money, value notes may be used to represent any form of commodity, whether transferable or not. For example, value notes could be used to represent transferable bearer bonds, nominee shares, options and derivatives, to enable transfers or trading over the Internet. In another example, value notes could be used to represent a lottery ticket, the commodity then being the selected lottery numbers. This would provide a secure method of selling lottery tickets over the Internet, while guaranteeing that the lottery number information cannot be tampered with once the lottery value note "ticket" has been issued. These are merely examples of a wide variety of applications for value notes in accordance with the present invention.

Further, the value notes might also include a guaranteed from, or guaranteed until date, in addition to the main valid from and expiry dates, for example as shown in FIG. 14. Such information would define a window in which the value note is guaranteed, and periods outside the window in which the value might still be valid, but is not guaranteed.

In order that an issuing authority can demonstrate that it has not exceeded a predetermined number, or liability, of issued value notes, the issuing authority may publish a list of all outstanding value notes and their values, for example, on a periodic basis. In the list, the contents of each value note could be represented by a digest signature, so that the contents of the notes remain secret. Any bearer can ascertain whether his value notes are on the list by searching for a digest signature and value which matches the information in the value note. The serial number of the note may also be provided in a readable form to facilitate searching. The issuing authority would be likely to ensure that the list is accurate, since enquiries would result if any bearer was unable to find a value note within the list.

The issuing authority might also back the issued value notes with a guaranteed value note from, for example, a bank. This would enable the issuing authority to indicate its maximum liability, so that user can verify from the list that the issuer is operating within its liability limits, and that the issuer is itself supported by a reputable bank up to the liability limit.

The invention claimed is:

1. A method for transferring a value representing a commodity in an electronic transaction comprising:
   providing a buyer value note, the buyer value note including a buyer public key, the value, and a first bank signature;
   appending the buyer value note with a seller public key;
   endorsing the buyer value note with a buyer endorsement signature such that the buyer endorsement signature is verified with the buyer public key;
   creating a seller value note, the seller value note including a seller public key and the value;
   disassociating the buyer public key and the buyer endorsement signature from the seller value note;
   deleting the buyer public key and the buyer endorsement signature such that the seller value note is anonymous with respect to the buyer value note; and
   endorsing the seller value note with a second bank signature whereby the value is transferred to the seller.

2. The method of claim 1 wherein the buyer value note further comprises expiry information such that the buyer value note is not redeemable outside of an expiry date.

3. The method of claim 1 wherein the buyer value note further comprises identification information for uniquely identifying the buyer value note.

4. The method of claim 3 wherein the identification information is selected from the group consisting of: a date of issuance, a time of issuance, a date of expiry, a time of expiry, an identification code, and an identification string.

5. The method of claim 1 wherein the buyer value note further comprises a redemption time such that the buyer value note is not redeemable before the redemption time.

6. The method of claim 1 wherein the buyer value note further comprises a guarantee term such that the buyer value note is guaranteed only within the guarantee term.

7. A method for transferring at least a portion of a value representing a commodity in an electronic transaction comprising:
   providing a first buyer value note, the first buyer value note including a buyer public key, a value, and a first bank signature;
   appending the first buyer value note with a seller public key, a previously presented value representing the at least the portion of the value, a change value representing the value less the previously presented value, and a buyer change public key;
   endorsing the first buyer value note with a buyer endorsement signature such that the buyer endorsement signature is verified with the buyer public key;
   creating a seller value note, the seller value note including a seller public key and the previously presented value;
   endorsing the seller value note with a second bank signature whereby the previously presented value is transferred to the seller;
   creating a second buyer value note, the second buyer value note including the buyer change public key and the change value;
   disassociating the buyer public key and the buyer endorsement signature from the seller value note;
   deleting the buyer public key and the buyer endorsement signature such that the seller value note is anonymous with respect to the buyer value note; and
   endorsing the second buyer value note with a third bank signature whereby the change value is retained by the buyer.

8. The method of claim 7 wherein the buyer value note further comprises expiry information such that the buyer value note is not redeemable outside of an expiry date.

9. The method of claim 7 wherein the buyer value note further comprises identification information for uniquely identifying the buyer value note.

10. The method of claim 9 wherein the identification information is selected from the group consisting of: a date of issuance, a time of issuance, a date of expiry, a time of expiry, an identification code, and an identification string.

11. The method of claim 7 wherein the buyer value note further comprises a redemption time such that the buyer value note is not redeemable before the redemption time.

12. The method of claim 7 wherein the buyer value note further comprises a guarantee term such that the buyer value note is guaranteed only within the guarantee term.

* * * * *